United States Patent
Kawakami

[11] Patent Number: 5,133,385
[45] Date of Patent: Jul. 28, 1992

[54] CHANGEOVER VALVE FOR WATER FILTER

[76] Inventor: Keiko Kawakami, 1-12-37 Ueshima, Hamama Tsu Shi, Shizuoka Ken, Japan

[21] Appl. No.: 787,142
[22] Filed: Nov. 4, 1991
[30] Foreign Application Priority Data
Nov. 30, 1990 [JP] Japan .................. 2-330641
[51] Int. Cl.$^5$ .......................................... F16K 11/085
[52] U.S. Cl. ......................... 137/625.43; 137/625.29
[58] Field of Search ................ 137/625.43, 625.29; 210/424

[56] References Cited
U.S. PATENT DOCUMENTS
3,669,148  6/1972  Burkhalter, Jr. et al. ..... 137/625.29
4,869,817  9/1989  Mendoza et al. ........... 137/625.29 X Primary Examiner—Arnold Rosenthal
Attorney, Agent, or Firm—Shoemaker and Mattare, Ltd.

[57] ABSTRACT

A changeover valve is disclosed; this valve has a valve case which has a water intake to be connected to a water supply device, a water outlet, a drain port, and two connecting ports to be connected to the two opposite ports on a water filter; a valve body which comprises an inner cylinder, an outer cylinder, an internal passage way defined between said inner and outer cylinders, an intake hole communicating the inner cylinder and the water intake of the valve case, a first passage way for connecting the inner cylinder to the space outside the outer cylinder, and a second passage way for connecting the internal passage way to the space outside said outer cylinder; and a control knob to rotate said valve body to "filtration", "rinsing" or "backwashing" position alternatively. Water from the water supply is filtered through the water filter and discharged through the water outlet of the valve case for service when at "filtration" position. Water from the water supply is guided through the water filter to wash the inner part of the water filter and then discharged through the drain port on the valve case when at "rinsing" position. Water from the water supply is guided through the water filter in a reverse direction for backwashing the water filter and then discharged out of the changeover valve through the drain port when at "backwashing" position.

1 Claim, 34 Drawing Sheets

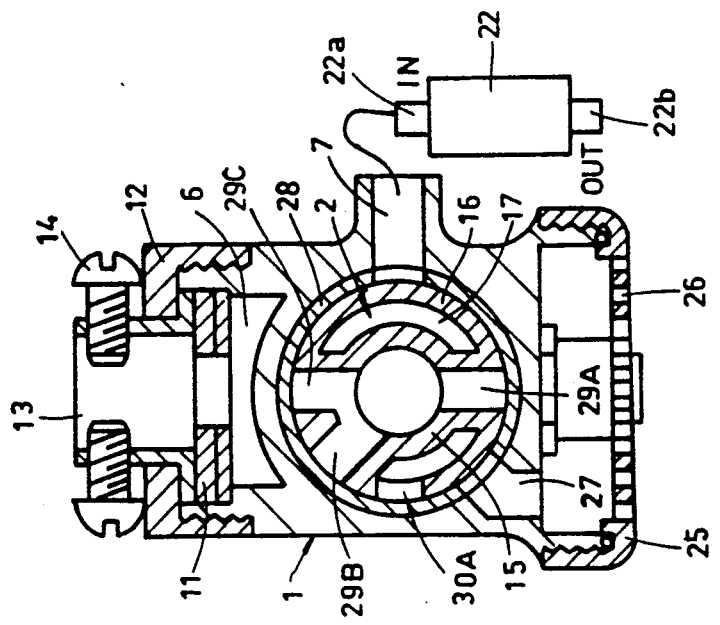
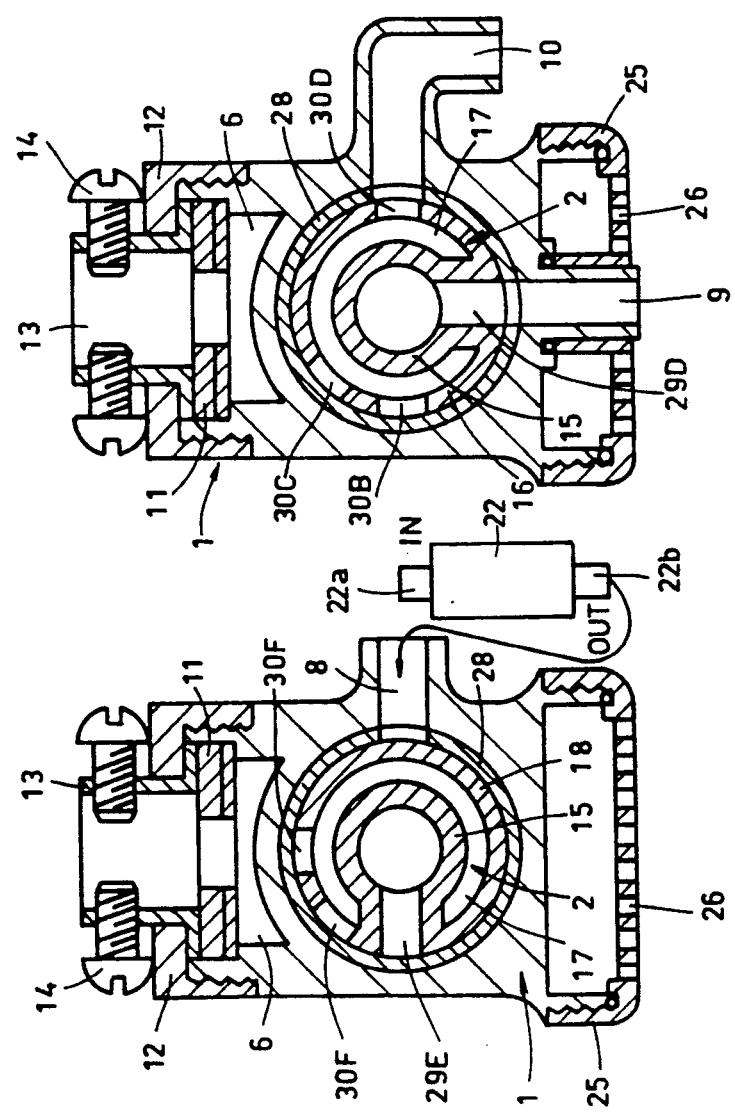
FIG.31
FIG.30
FIG.29

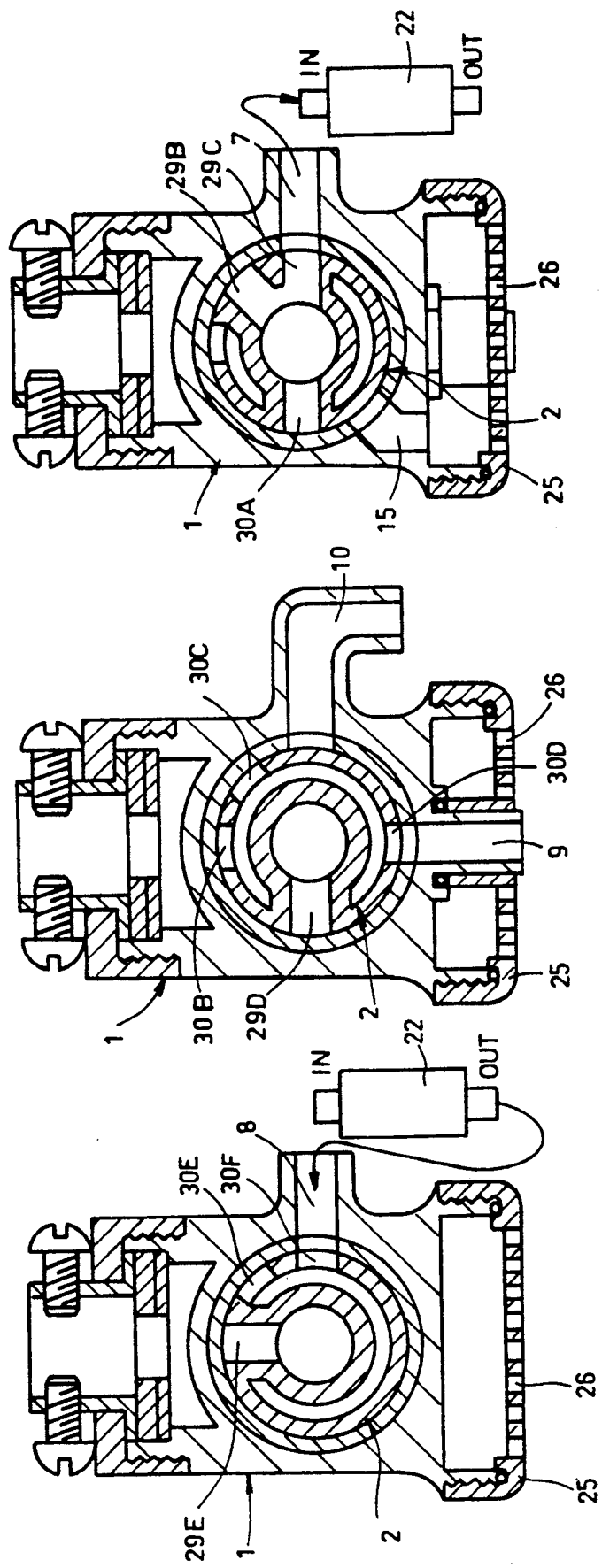

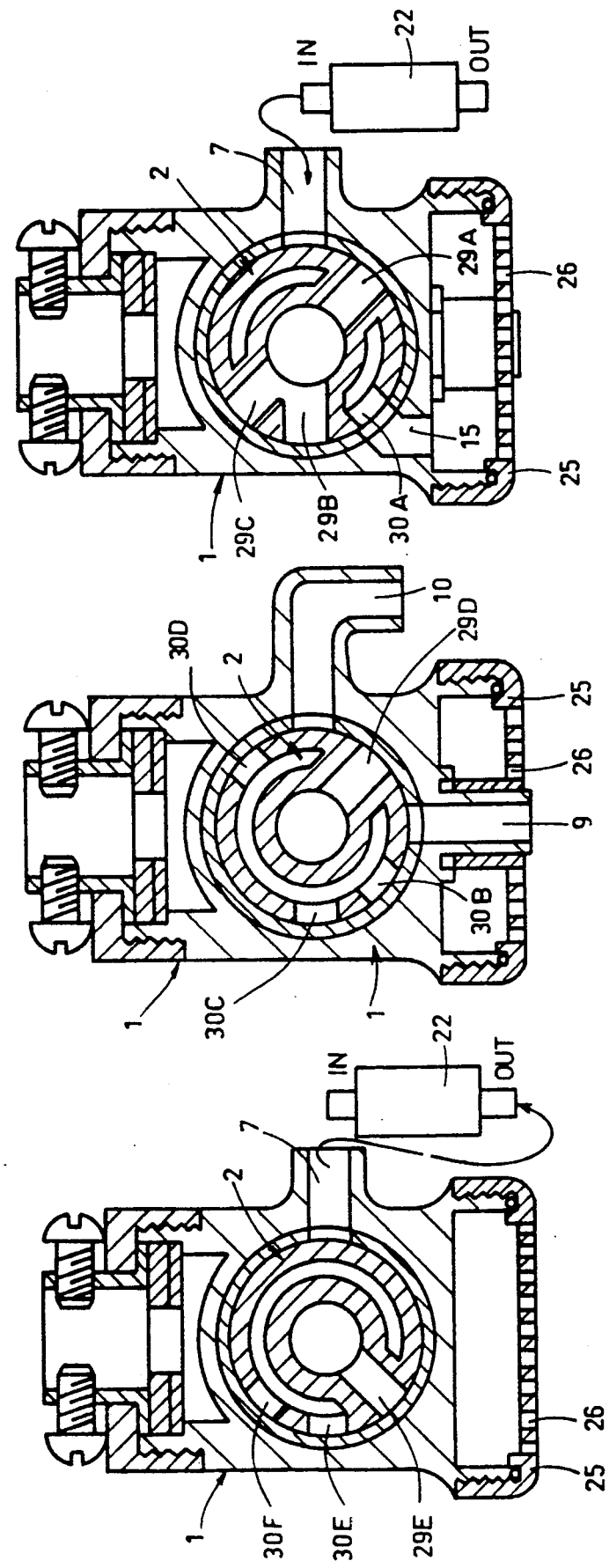

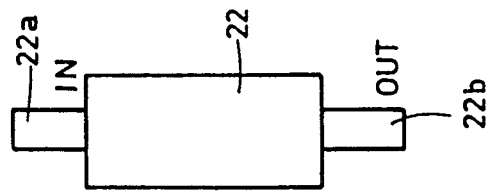
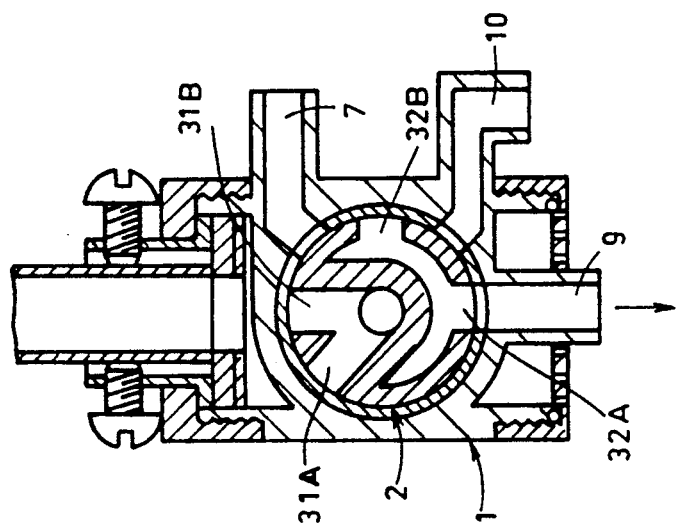
FIG.50
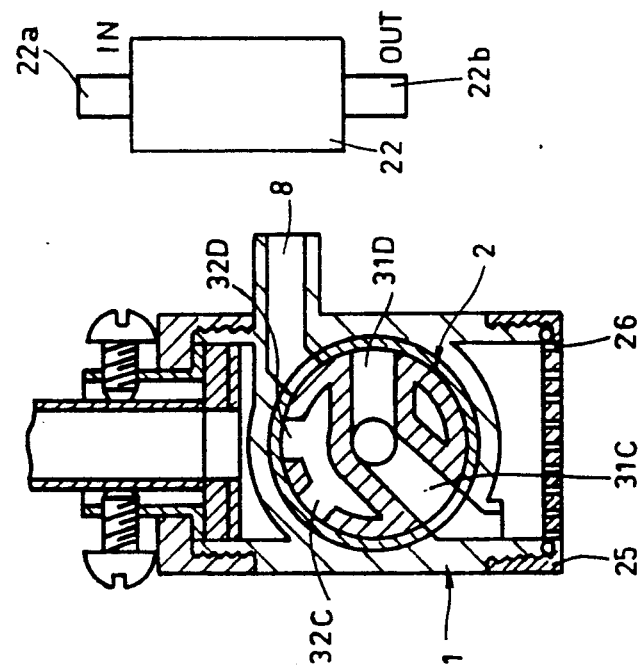
FIG.49

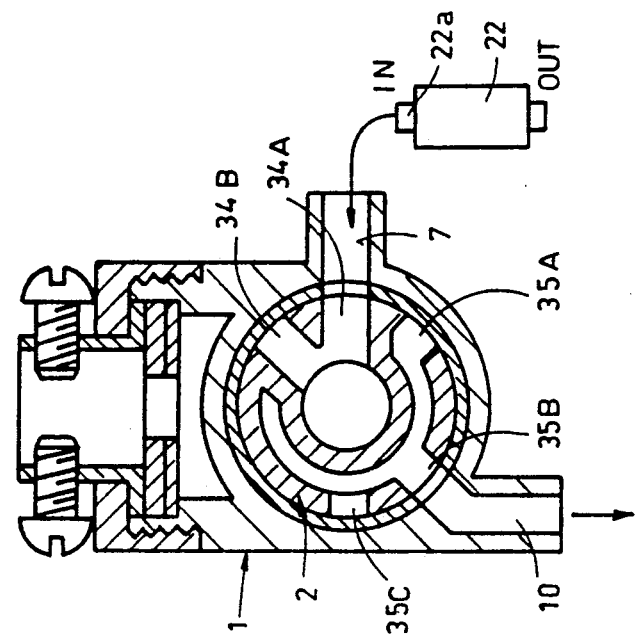
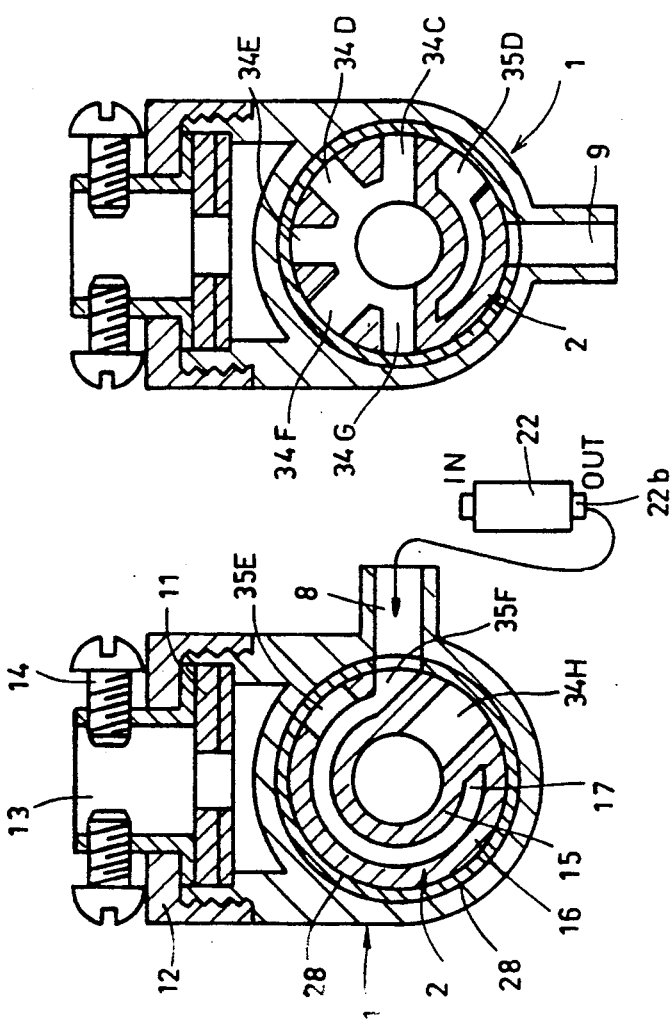
FIG.58
FIG.57
FIG.56

CHANGEOVER VALVE FOR WATER FILTER

BACKGROUND OF THE INVENTION

1. Field of the Invention

The present invention relates to a changeover valve and relates more particularly to a changeover valve to be connected between a water filter and a water supply device to control the direction of the flow of water for filtration through the water filter, or for rinsing or backwashing the water filter.

2. Description of the Prior Art

In a water supply system provided with a water filter, backwashing has been commonly used to remove dirts from the strainer or filter element of the water filter. To backwash through a water filter, a changeover valve (which may also be referred to as a switching valve) is often used to connect the water supply device such as a faucet, and the water filter. By means of a changeover valve, the flow of water from the supply device can be guided to pass through the water filter in a forward direction for filtration or in a backward direction through the water filter to remove dirts from the water filter.

A conventional changeover valve for a water filter commonly comprises a valve case which has a water intake connected to a water supply device, a first connecting port and a second connecting port respectively connected to an inlet port and an outlet port of the water filter, a water outlet to discharge therethrough the filtrate from said water filter, and a drain port to carry dirty water out of the valve. The valve also has a valve body operable by a mechanism in the valve case to change the position of the valve body and thereby to permit the flow of water from the water supply to be discharged through the water outlet or through the drain port. When the valve is rotated to a filtration position to permit the flow of water to be filtered through the water filter, the water from the water supply will pass through the water intake and the first connecting port of the valve, the inlet port of the water filter, the outlet port of the water filter, the second connecting port and the water outlet of the valve case. When the valve is rotated to a backwashing position to permit the flow of water to flow through the water filter in the backward direction in order to remove dirts from the strainer or filter element, the water from the water supply device will pass through the water intake and the second connecting port of the valve, the water outlet port of the water filter, the water inlet port of the water filter, the first connecting port and the drain port of the valve. Such conventional changeover valve is still not satisfactory in use because it can not eliminate two problems.

The first problem happens during backwashing. When the water flows through a water filter in a backward direction during backwashing, the dirts which are carried in the water tend to be stopped by the filter element and accumulate at the water intake port of the water filter. The dirts may then be carried by the water when the valve body is rotated to the filtration position and discharged with the filtered water through the water outlet port of the valve.

The second problem happens during filtration. When water passes through the water filter which has not been operated for a prolonged period of time, decayed organic matter in the residual water retained in the water filter may be carried by the filtrate from the water filter and discharged through the water outlet port of the valve.

Therefore, a water filter must be rinsed both before filtration and after backwashing. To rinse a water filter, the flow of water must be guided through the water filter in a forward direction so that dirts are carried out of the water filter. The changeover valve which connects the water supply device and the water filter should therefore have a drain port separated from the water outlet port thereof to discharge rinsing water so as to prevent possible contamination. A conventional changeover valve simply has a water outlet port for the discharge of flow of water out of the valve, therefore the filtered water may still contain dirts or decayed matter.

SUMMARY OF THE INVENTION

The present invention has been accomplished with these circumstances in mind. According to the present invention, a changeover valve connecting a water supply device (which may be a faucet) and a water filter, comprises a valve case, a valve body disposed in said valve case, and a control knob to control the position of said valve body. The valve case comprises a water intake to be connected to the water supply device, a water outlet, a drain port, a first connecting port connected to the water inlet port of the water filter, and a second connecting port connected to the water outlet port of the water filter. The valve body, rotatably disposed in the valve case, comprises an inner cylinder, an outer cylinder surrounding said inner cylinder, an internal passage way defined between said inner and outer cylinders, an intake hole to guide the flow of water from the water intake of the valve case into said inner cylinder, a first passage way in the outer cylinder to connect an internal space in the inner cylinder to the space outside the outer cylinder, and a second passage way in the outer cylinder to connect said internal passage way to the space outside the outer cylinder. Rotating the control knob causes the valve body to be alternatively rotated to the the "filtration" position, the "backwashing" position, or the "rinsing" position. When the valve body is rotated to the "filtration" position, the water is guided through the water filter in a forward direction and discharged out of the valve case through the water outlet thereof. When the valve body is rotated to the "backwashing" position, the water is guided through the water filter in a reverse direction and discharged out of the valve case through the drain port thereof. When the valve body is turned to the "rinsing" position, the water is guided through the water filter in a forward direction and discharged out of the valve case through the drain port thereof.

Further, the first passage way of the valve body is connected to the first connecting port of the valve case when the valve body is rotated to the "filtration" position. The first passage way is connected to the second connecting port of the valve case when the valve body is rotated to the "backwashing" position. The first passage way is also connected to the first connecting port when the valve body is rotated to the "rinsing" position. The second passage way of the valve body is connected to the first connecting port and the water outlet of the valve case when the valve body is rotated to the "filtration" position. The second passage way of the valve body is connected to the second connecting port and the drain port of the valve case when the valve body is rotated to "backwashing" position. The second passage way of the valve body is also connected to the first connecting port and the drain port of the valve case when the valve body is rotated to the "rinsing" position.

In the "filtration" position, water flows through the water intake of the valve case, the first connecting port of the valve case, the water inlet port of the water filter, the water filter, the water outlet port of the water filter, the second connecting port and then through the water outlet of the valve case. In the "backwashing" position, the water flows through the water intake and the second connecting port of the valve case, the water outlet port of the water filter, the water filter, the water inlet port of the water filter, the first connecting port of the valve case and then through the drain port of the valve case. In the "rinsing" position, water flows through the water intake and the first connecting port of the valve case, the water inlet port of the water filter, the water filter, the water outlet port of the water filter, the second connecting port, and the drain port of the valve case.

In general, the present invention provides a changeover valve which is compact and simple in structure and which provides a rinsing function to remove dirts from the water filter to which it is connected so the dirts can be carried out of the valve case through a drain port separate from the water outlet which is provided to discharge clean filtered water. Contamination problems can therefore be eliminated.

BRIEF DESCRIPTION OF THE DRAWINGS

The present invention will now be described by way of examples with reference to the annexed drawings, in which:

FIGS. 1 through 17 illustrate a first embodiment of the changeover valve of the present invention, wherein:

FIG. 1 is a cross sectional view of the first embodiment of the changeover valve of the present invention taken in a longitudinal direction;

FIGS. 2 through 6 are plan views of the first embodiment of the changeover valve of the present invention taken in different directions showing the outer appearance of the changeover valve;

FIGS. 7, 8 and 9 are longitudinally cross sectional views of the first embodiment of the changeover valve of the present invention;

FIG. 10 is a cross sectional view taken along line A—A of FIG. 1;

FIG. 11 is a cross sectional view taken along line B—B of FIG. 1;

FIGS. 12 through 17 are cross sectional views of the first embodiment of the changeover valve of the present invention, showing the several water flow routes controlled by means of the control knob;

FIGS. 18 through 22 illustrate a second embodiment of the changeover valve of the present invention, wherein:

FIG. 18 is a longitudinal cross sectional view of the second embodiment of the changeover valve;

FIGS. 19 through 22 are cross sectional views of the second embodiment of the changeover valve showing the water passage ways in different valve zones;

FIGS. 23 through 46 illustrate a third embodiment of the changeover valve of the present invention, wherein:

FIG. 23 is longitudinal cross sectional view of the third embodiment of the changeover valve;

FIGS. 24 through 28 are plan views taken in different directions showing the outer appearance of the third embodiment of the changeover valve;

FIG. 29 is a cross sectional view taken along line E—E of FIG. 27;

FIG. 30 is a cross sectional view taken along line D—D of FIG. 27;

FIG. 31 is a cross sectional view taken along line C—C of FIG. 27;

FIGS. 32 through 46 are cross sectional views of the third embodiment of the changeover valve showing the water passage ways in different valve zones;

FIGS. 47 through 54 are cross sectional views of a fourth embodiment of the changeover valve of the present invention showing the water passage ways in different valve zones;

FIGS. 55 through 58 are cross sectional views of a fifth embodiment of the changeover valve of the present invention, wherein:

FIG. 55 is a longitudinal cross sectional view of the changeover valve;

FIG. 56 is a cross sectional view taken along line F—F of FIG. 55;

FIG. 57 is a cross sectional view taken along line G—G of FIG. 55;

FIG. 58 is a cross sectional view taken along line H—H of FIG. 55;

FIGS. 60 through 71 illustrate a seventh embodiment of the changeover valve of the present invention, wherein:

FIGS. 60 through 62 are plan views taken in different directions showing the outer appearance of the changeover valve;

FIG. 63 is a cross sectional view taken along line I—I of FIG. 62;

FIG. 64 is a cross sectional view taken along line J—J of FIG. 62;

FIG. 65 is a cross sectional view taken along line K—K of FIG. 62; and

FIGS. 66 through 71 are cross sectional views of the changeover valve showing the water passage ways in different valve zones.

DETAILED DESCRIPTION OF THE PREFERRED EMBODIMENT

Figure 1:
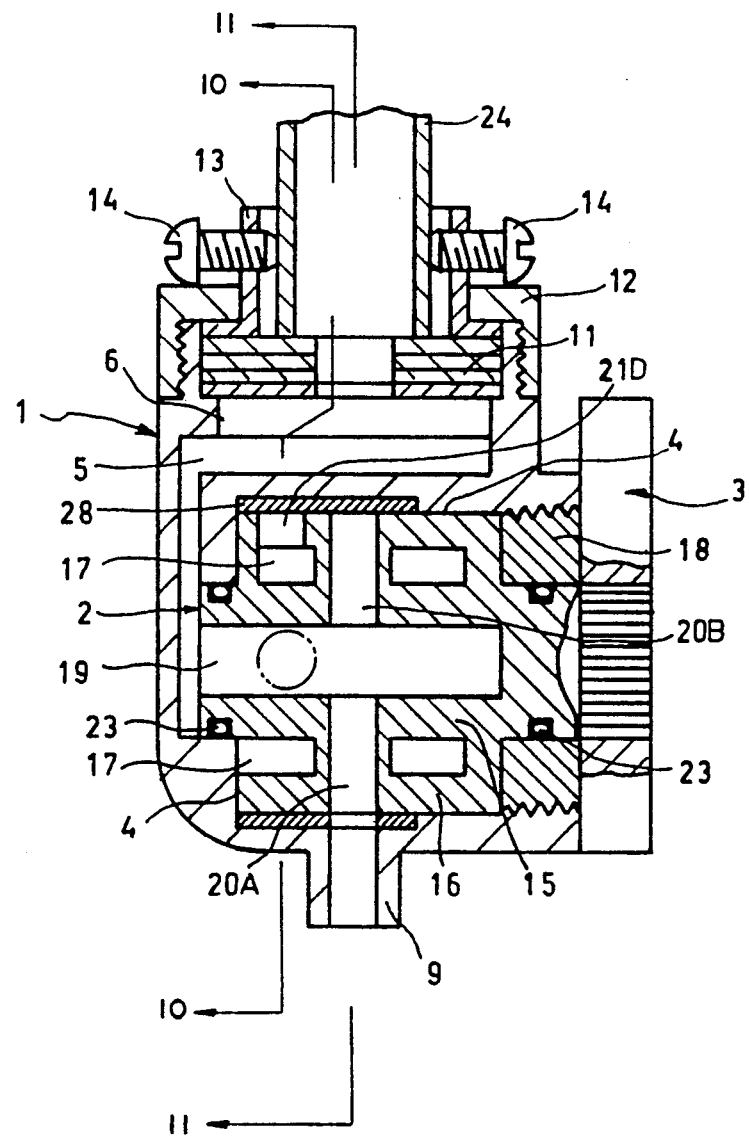

FIGS. 1 through 17 illustrate a first embodiment of the changeover valve as constructed in accordance with the present invention. In this embodiment, the valve is divided axially into two zones each of which has passage ways distributed in a circumferential direction.

As illustrated in FIGS. 1 through 9, the changeover valve has a valve case 1, a valve body 2, and a control knob 3. Valve case 1 has an open top, and defines therein a valve chamber 4 and a passage way 5. The valve chamber 4 is formed into a cylindrical shape having a horizontal axis; one end of valve chamber 4 is open and communicates with the outside of valve case 1 and an opposite end disposed in communication with the passage way 5. The passage way 5 is formed adjacent to the valve chamber 4 so as to connect the open top of valve case 1 and the open end of valve chamber 4. The open top of the valve case 1 forms into a water intake 6. A first connecting port 7 and a second connecting port 8 are respectively formed on the upper side of the wall of the valve case 1 which surrounds the valve chamber 4; the two connecting ports are disposed with a space in between, in axial direction with respect to the valve chamber respectively. A water outlet 9 and a drain port 10 are formed on the lower side of the wall of the valve case 1 right below the first and second connecting port 7 and 8 respectively. The water intake 6, the first and second connecting ports 7 and 8, the water outlet 9 and the drain port 10 respectively communicate with the interior of the valve chamber 4. Packings 11 are placed in water intake 6 and retained by a socket 13 which is secured in place by a lock nut 12, which socket 13 has a plurality of screw bolts for fastening the socket 13 onto water supply pipe 24. A valve body 2 is rotatably placed in valve chamber 4, with a seal 28 disposed around the valve body 2.

The valve body 2 comprises an inner cylinder portion 15, an outer cylinder portion 16 surrounding inner cylinder portion 15 and a passage way 17 defined between the inner and outer cylinder portions 15 and 16. The valve body 2 further comprises an intake hole 19 for guiding water from the water intake 6 of the valve case 1 to the inner cylinder portion 15, passage ways formed on the wall of outer cylinder portion to communicate the inner cylinder portion 15 with the outside of the outer cylinder portion 16 and passage ways on the outer cylinder portion 16 for connecting the passage way 17 to the outside of the outer cylinder portion 16. The valve body 2 is disposed in the valve chamber 4 of the valve case 1 with an inner end rotatably inserted in a hole of an inner wall of valve chamber 4 which communicates with the passage way 5, and an opposite outer end rotatably supported by a supporting ring 18 to which the control knob 3 is fixedly attached. By rotating the control knob 3, the valve body 2 is caused to rotate, and therefore, the position of outer cylinder portion 16 relative to valve case 1, is changed so that the "filtration" position, "backwashing" position, and "rinsing" position are selected.

Figure 10:
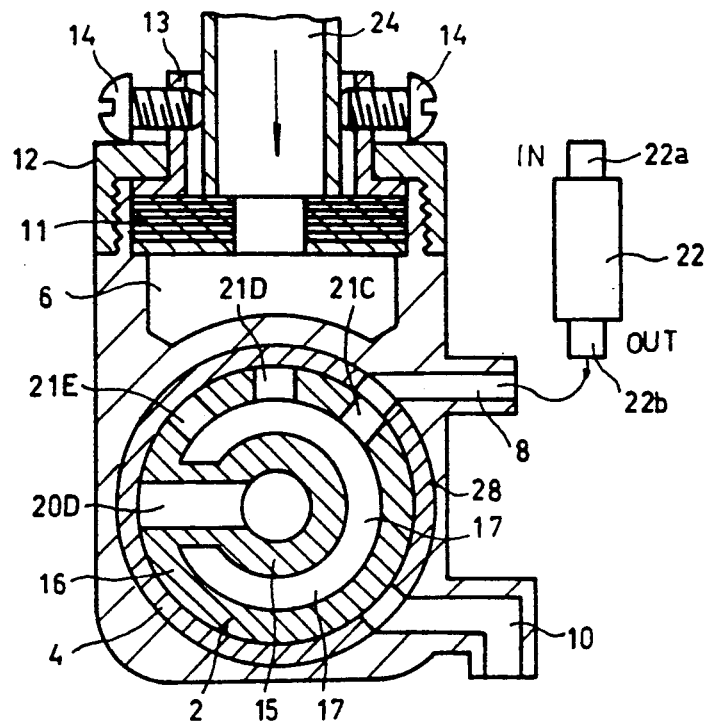
Figure 11:
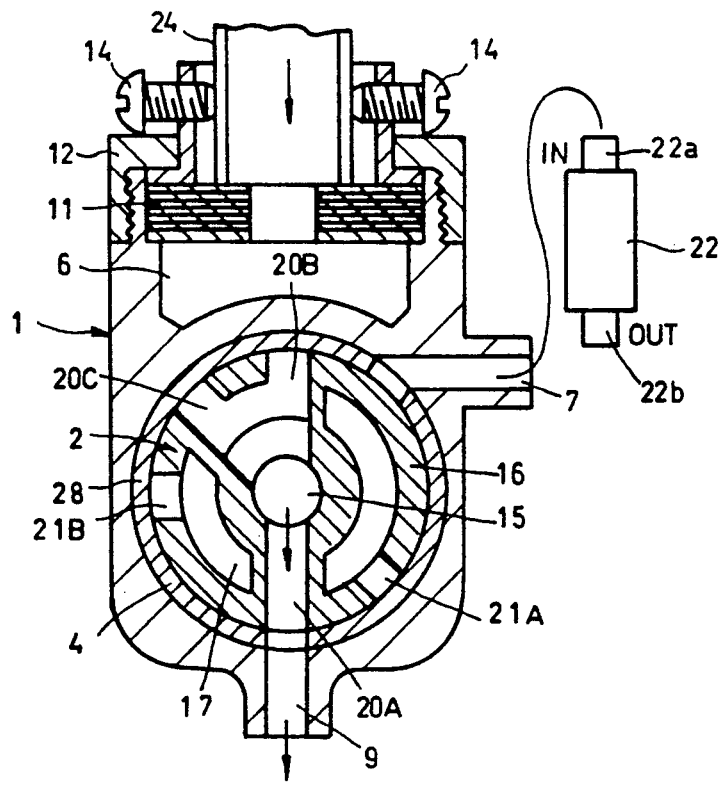

As shown in the drawings, the valve body 2 has an intake hole 19 connected to the passage way 5 in the valve case 1, and is divided into a first valve zone corresponding with the first connecting port 7 and the water outlet 9 of the valve case 1, and a second valve zone corresponding with the second connecting port 8 and the drain port 10. In the first valve zone, as shown in FIG. 11 (the cross section taken along line B—B of FIG. 1), there are provided a plurality of passage ways 20A, 20B, 20C, and a plurality of passage ways 21A, 21B, to guide the water to flow in radial directions. In the second valve zone, as shown in FIG. 10 (the cross section taken along line A—A of FIG. 1), there are provided a passage way 20D and a plurality of passage ways 21C, 21D, and 21E. The number and the relative positions of the passage ways in each valve zone of the valve body 2 are decided in accordance with the requirements for performing the above described functions. Further, the valve body 2 is sealed with O-ring 23.

Figure 2:
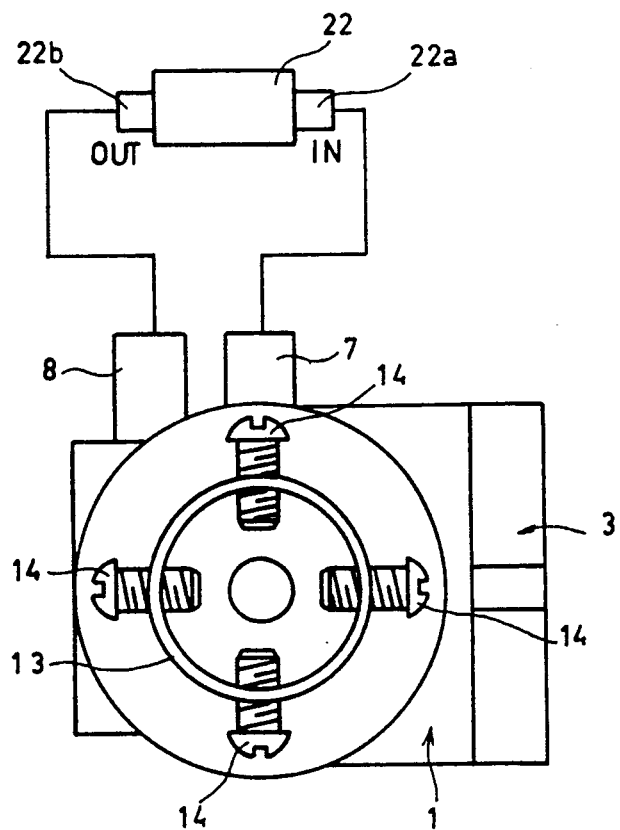
Figure 3:
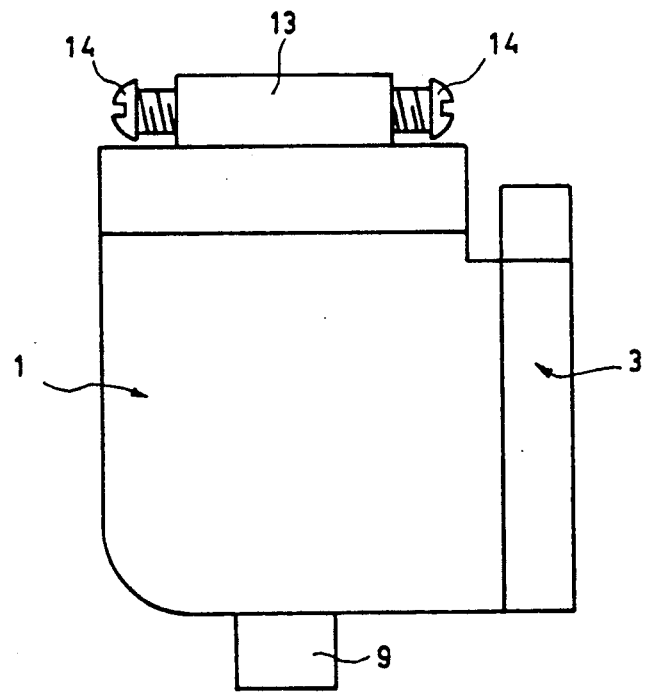
Figure 4:
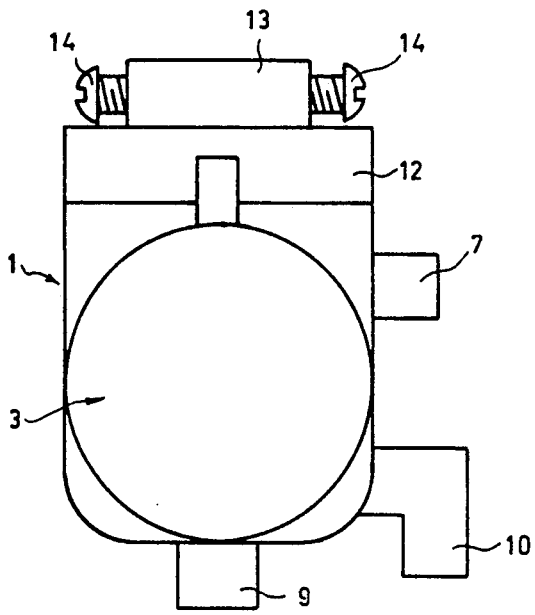
Figure 5:
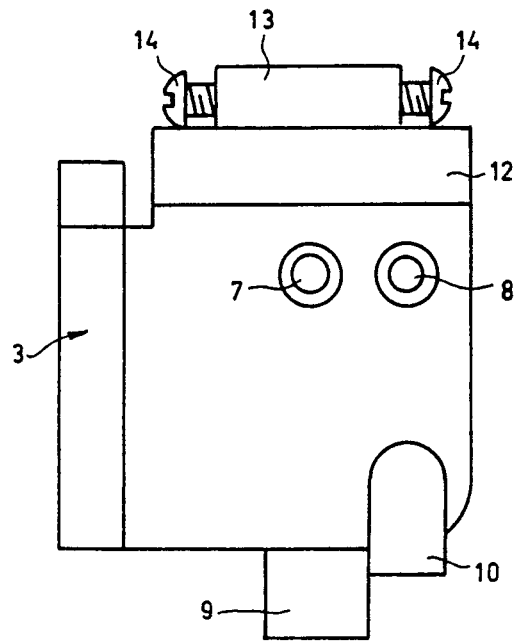
Figure 6:
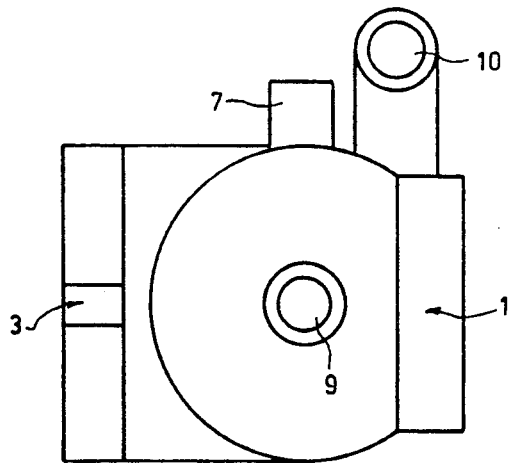
Figure 7:
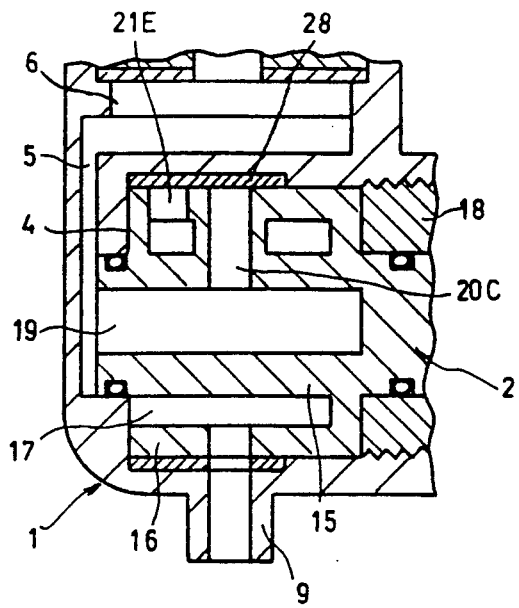
Figure 8:
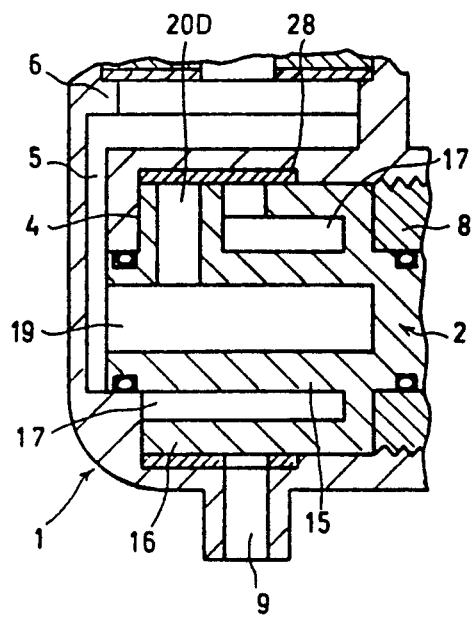
Figure 9:
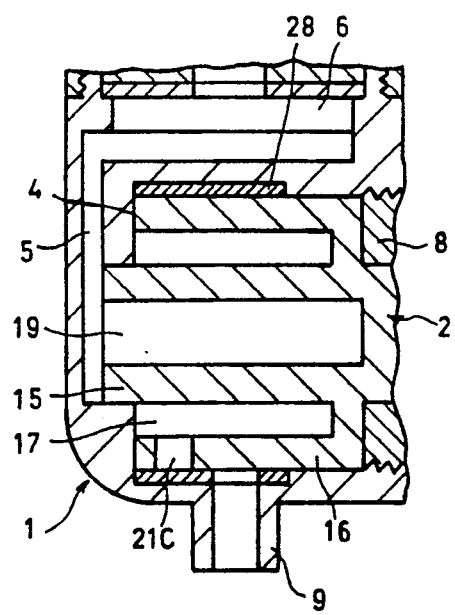

The changeover valve of the present invention is applicable for home use as well as for use in industrial or commercial utilities. When in use, the socket 13 at the water intake 6 of the valve case 1 is connected to a water supply pipe 24 and secured in position by fastening tight the screw bolts 14, as shown in FIG. 2, the first connecting port 7 is connected to the water inlet port 22a of the water filter 22 by means of a hose, and the second connecting port 8 is connected to the water outlet port 22b of the water filter 22. The water outlet 9 of the valve case 1 may be attached with a hose and connected to a sink.

The operation of the aforesaid embodiment is outlined hereinafter with reference to FIGS. 10 through 17. By rotating the control knob 3, the valve body can be alternatively changed to "primeval water", "filtration", "rinsing" "backwashing" position.

Referring to FIGS. 10 and 11 and seeing FIG. 1 again, when the valve body 2 is rotated to the "primeval water" position, water is guided through the water outlet 9 of valve case 1 without passing through the water filter 22. FIG. 10 is a cross sectional view of the valve case 1 and the valve body 2 at the second valve zone, and FIG. 11 is a cross sectional view of the valve case 1 and the valve body 2 at the first valve zone. In the first valve zone, the passage way 20A of the valve body 2 is connected to the water outlet 9 of the valve case 1 and disconnected from the first connecting port 7. In the second valve zone, the passage way 21C is connected to the second connecting port 8 of the valve case 1 and disconnected from the drain port 10. Therefore, water from the water supply pipe 24 flows through the water intake 6 into the water passage way 5 of the valve case 1 and further into the inner cylinder portion 15 of the valve body 2 through the intake hole 19 and then passes through the water passage way 20A of the valve body 2 for discharging out of the valve case 1 through the water outlet 9.

Figure 12:
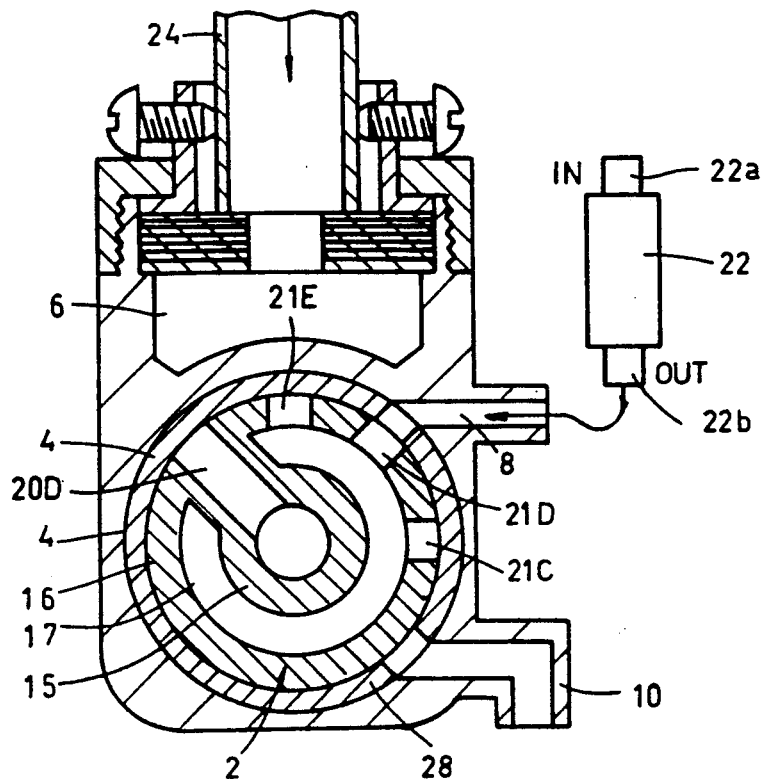
Figure 13:
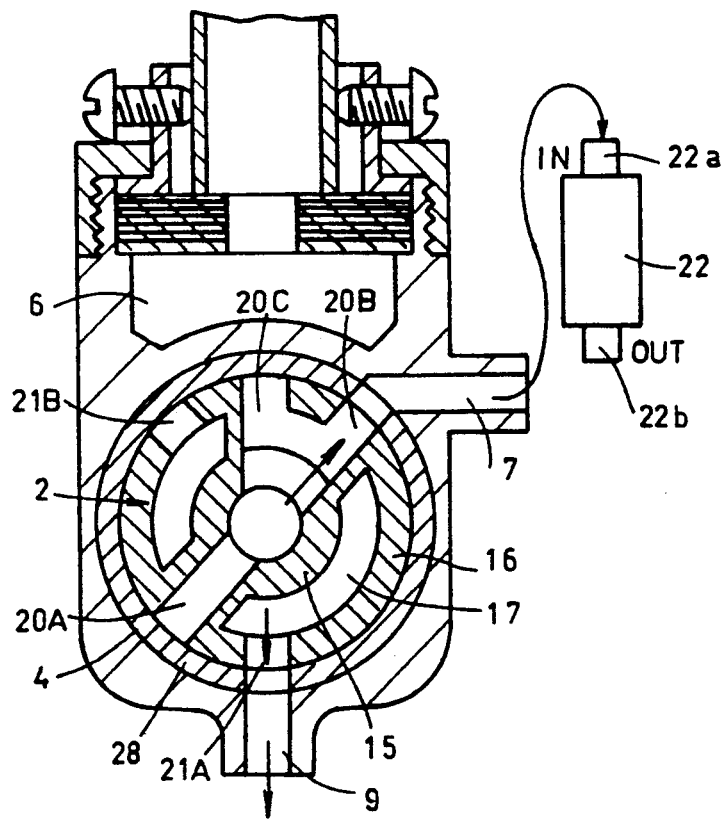

Referring to FIGS. 12 and 13 and seeing FIG. 7 again, when the valve body is rotated to the "filtration" position, water is guided through the water filter 22 for filtration. FIG. 12 is a cross sectional view of the valve case 1 and the valve body 2 at the second valve zone, and FIG. 13 is a cross sectional view of the valve case and the valve body 2 at the first valve zone. In the first valve zone, the passage way 21A of the valve body 2 is connected to the water outlet 9 of the valve case 1 and the passage way 20B of the valve body 2 is connected to the first connecting port 7 of the valve case 1. In the second valve zone, the passage way 21D of the valve body 2 is connected to the second connecting port 8 of the valve case 1 and disconnected from the drain port 10. Therefore, water from the water supply pipe 24 passes through the water intake 6 and the water passage way 5 of the valve case 1, the intake hole 19 and the inner cylinder portion 15 of the valve body 2, and then passes through the passage way 20B and the first connecting port 7 into the water filter 22 via the water inlet port 22a. While passing through the water filter 22, water is filtered by the filter element in the water filter 22 and then discharged out of the water outlet port 22b into the second connecting port 8 of the valve case 1 from which water is guided through the passage way 21D into the passage way 17 and then guided into the water passage way 21A for discharge out of the valve case 1 through the water outlet 9.

Figure 14:
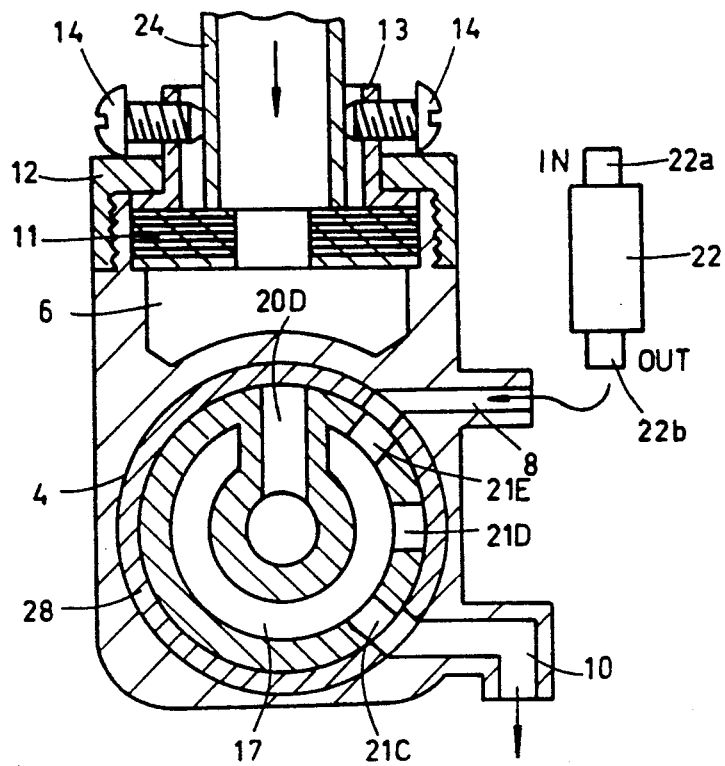
Figure 15:
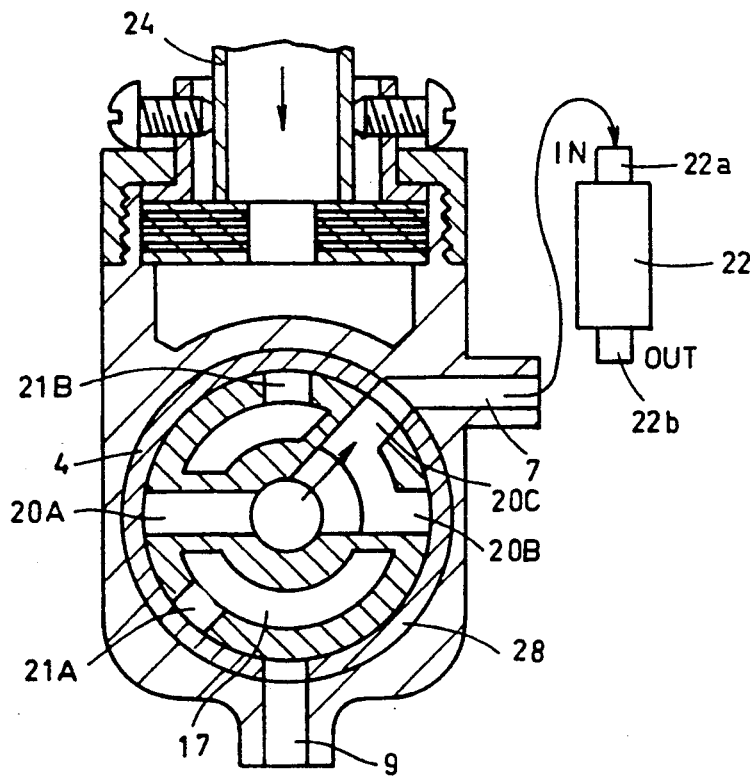

Referring to FIGS. 14 and 15, and seeing FIG. 8 again, when the valve body is rotated to the "rinsing" mode, water is also guided through the water filter 22 for filtration. FIG. 14 is a cross sectional view of the valve case 1 and the valve body 2 at the second valve zone, and FIG. 15 is a cross sectional view of the valve case 1 and the valve body 2 at the first valve zone. In the first zone, the passage way 20C of the valve body 2 is connected to he first connecting port 7 of the valve case 1 and is disconnected from the water outlet 9. In the second valve zone, the passage way 21E of the valve body 2 is connected to the second connecting port 8 of the valve case 1, and therefore it is connected to the drain port 10 via the passage way 21C. Therefore, the water from the water supply pipe 24 passes through the water intake 6 of the valve case 1, the passage way 5, the intake hole 19, the inner cylinder portion 15, the passage way 20C, the first connecting port 7, the water inlet port 22a of the water filter 22, the water outlet port 22b of the water filter 22, the second connecting port 8 of the valve case 1, the passage way 21E and the passage way 17 into the passage way 21C and then flows out of the valve case 1 through the drain port 10. While water is guided to pass through the water filter 22, the dirts accumulated at the water inlet port 22a are carried out of the water filter 22 and discharged through the drain port 10 of the valve case 1.

Figure 16:
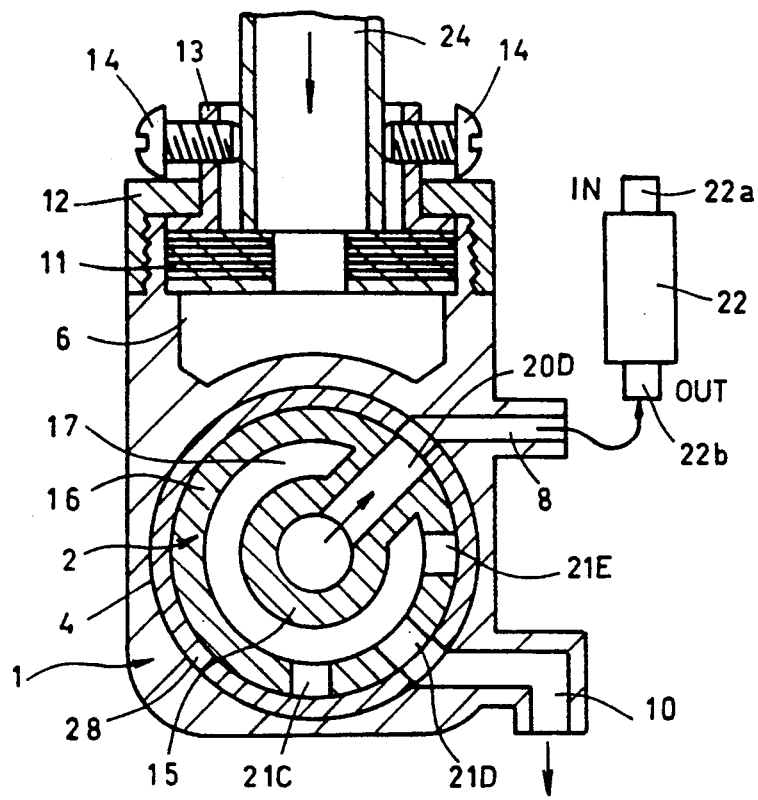
Figure 17:
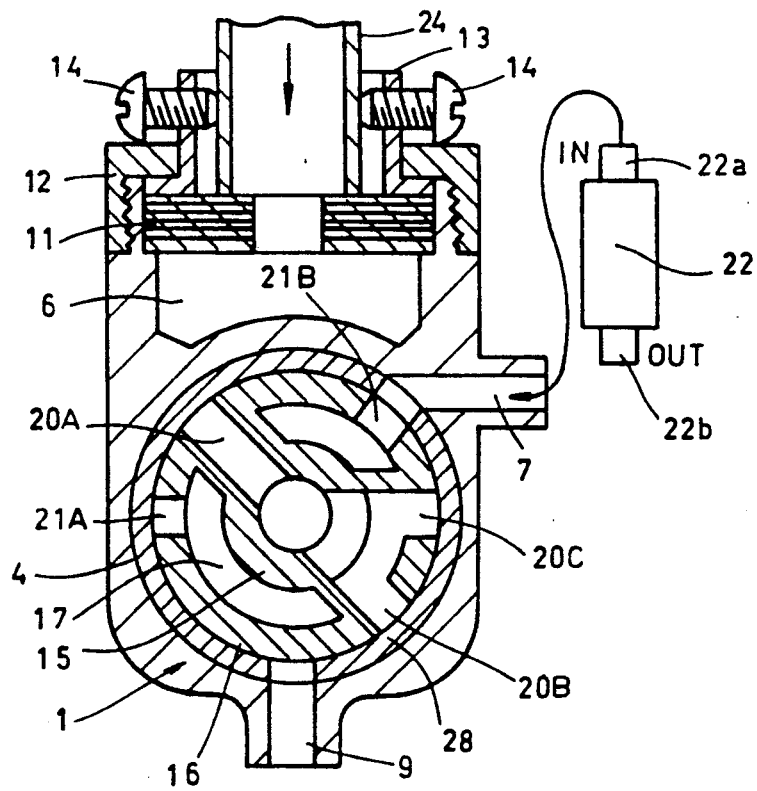

Referring to FIGS. 16 and 17 and seeing FIG. 9 again, when the valve is changed to the "backwashing" position, water is guided to flow backwards through water filter 22 and then guided to discharge out of the drain port 10. FIG. 16 is a cross sectional view of the valve case 1 and the valve body 2 at the second valve zone, and FIG. 17 is a cross sectional view of the valve case 1 and the valve body 2 at the first valve zone. In the first valve zone, the passage way 21B of the valve body 2 is connected to the first connecting port 7 of the valve case 1 and is disconnected from the water outlet 9. In the second valve zone, the passage way 20D of the valve body 2 is connected to the second connecting port 8 of the valve case 1, and therefore it is connected to the drain port 10 via the passage way 21D. Therefore, the water from the water supply pipe 24 passes through the water intake 6 of the valve case 1, the passage way 5, the water intake hole 19 of the valve body 2, the inner cylinder portion 15, the passage way 20D, the second connecting port 8 of the valve case 1, the water outlet port 22b, the water filter 22, the water inlet port 22a, the fist connecting port 7 of the valve case 1, the passage way 21B of the valve body 2 and the passage way 17 into the passage way 21D of the valve body 2 for further discharge out of the valve case 1 through the drain port 10. By means of this arrangement, dirts adhered to the filter element in the water filter 22 can be carried out of the water filter 22 and discharged through the drain port 10. After the operation of "backwashing", the operation of "rinsing" is performed so that any dirts can be carried out of the valve case 1 through the drain port 10 without passing through the water outlet 9. Therefore, the water outlet 9 will not be contaminated. And, the water passing through the filter in a filtration operation immediately after the backwashing operation will not contain any dirts.

Further, in case the water filter 22 was suspended from use for a prolonged time period, it must be "rinsed" before use; i.e., any decayed water inside the water filter 22 must be cleaned before the operation of "filtration". By means of the "rinsing" operation, the water filter 22 can be easily cleaned thoroughly.

Figure 18:
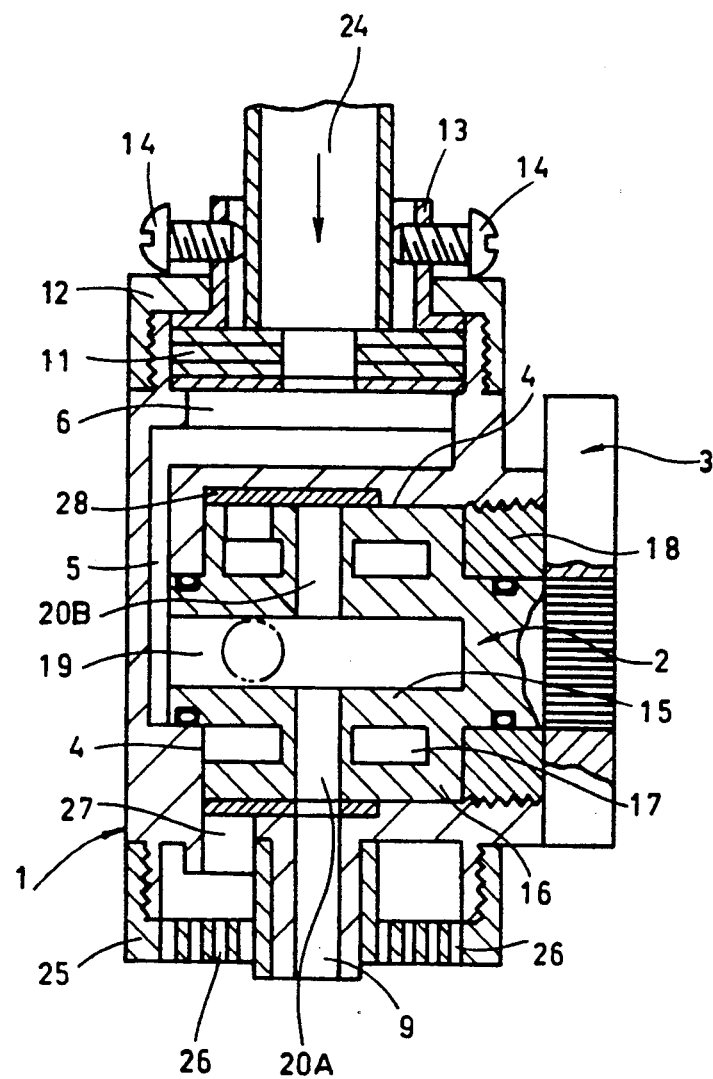
Figure 19:
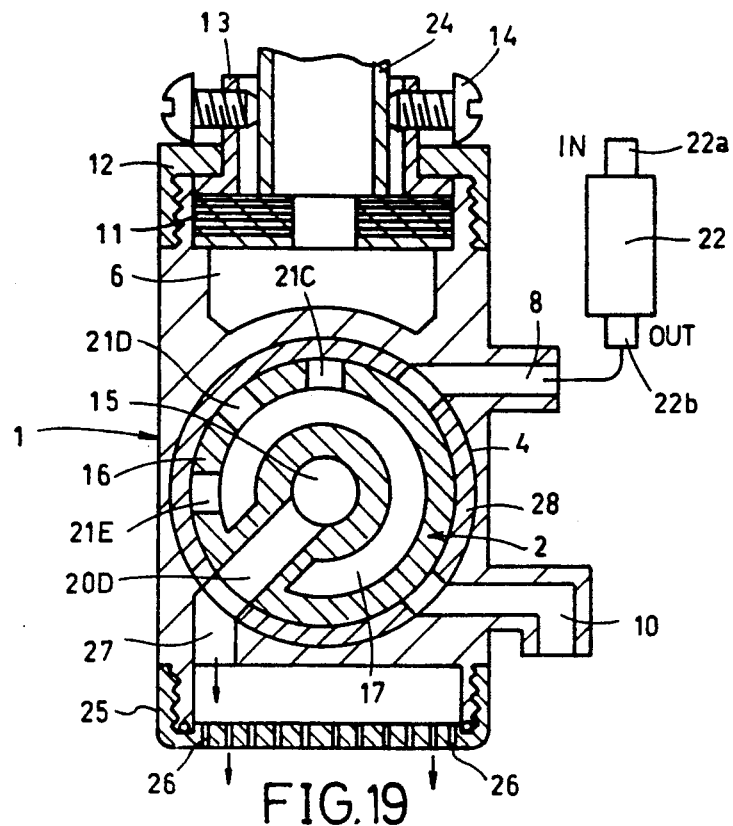
Figure 20:
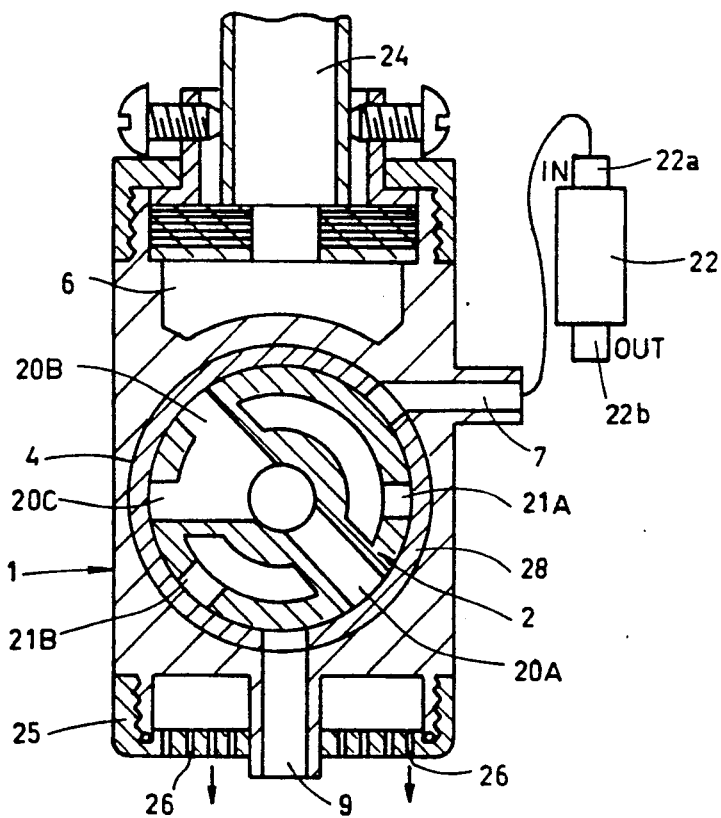

Referring to FIGS. 18 through 22, therein illustrated is a second embodiment of the present invention. In this embodiment, the changeover valve is used for a shower. FIG. 18 illustrates the internal structure of the changeover valve of the second embodiment. Same numerals are used if designated for the same parts as indicated in the first embodiment. In this embodiment, the valve case 1 has a water outlet 27 formed thereon at the bottom and disposed in communication with the valve chamber 4, and a circular shower cap 25 attached thereto covering over the water outlet 27, which circular shower cap 25 has a plurality of small holes 26 made thereon for producing fine streams of water. In this embodiment, the changeover valve provides a "shower" function in addition to the functions of "primeval water", "filtration", "backwashing" and "rinsing". FIGS. 19 and 20 show that the changeover valve is set in the "shower" position to perform the shower function. FIG. 19 is a cross sectional view of the valve case 1 and the valve body 2 at the second valve zone. FIG. 20 is a cross sectional view of the valve case 1 and the valve body 2 at the first valve zone. In the first valve zone, the first connecting port 7 of the valve case 1 is not connected to the water outlet 9. In the second valve zone, the second connecting port 8 of the valve case 1 is not connected to the drain port 10 but connected to the water outlet 27 through the passage way 20D. Therefore, flow of water passes through the passage way 20D into the water outlet 27 for producing fine streams of water through the small holes 26 on the circular shower cap 25.

Figure 21:
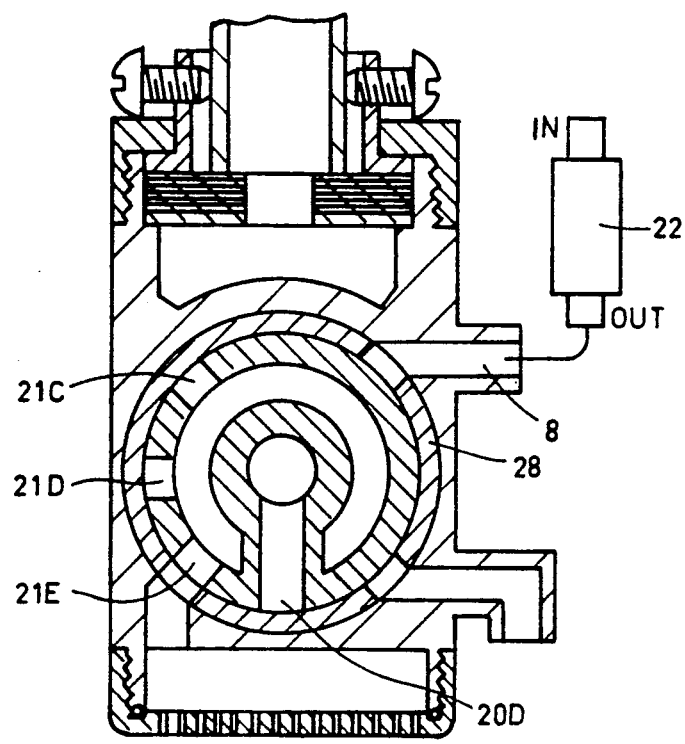
Figure 22:
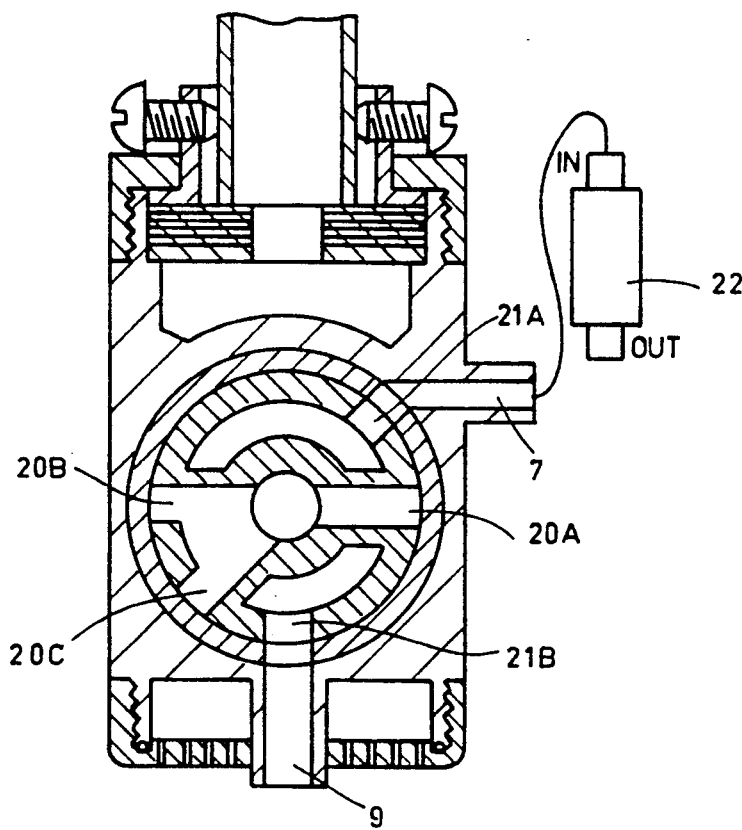
Figure 23:
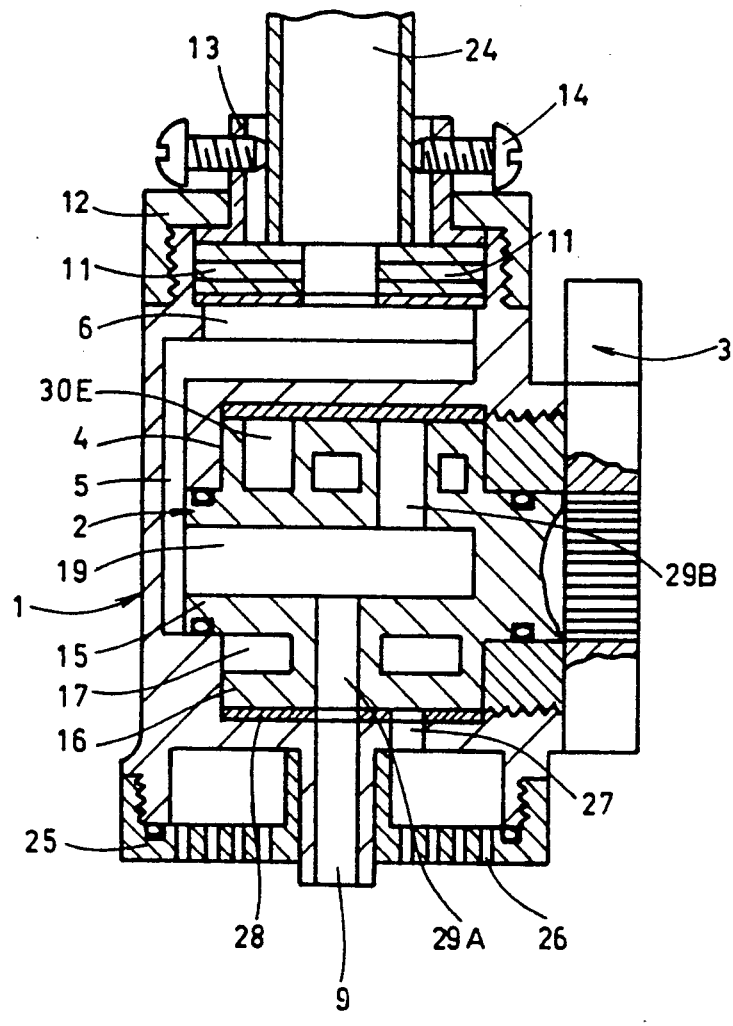
Figure 24:
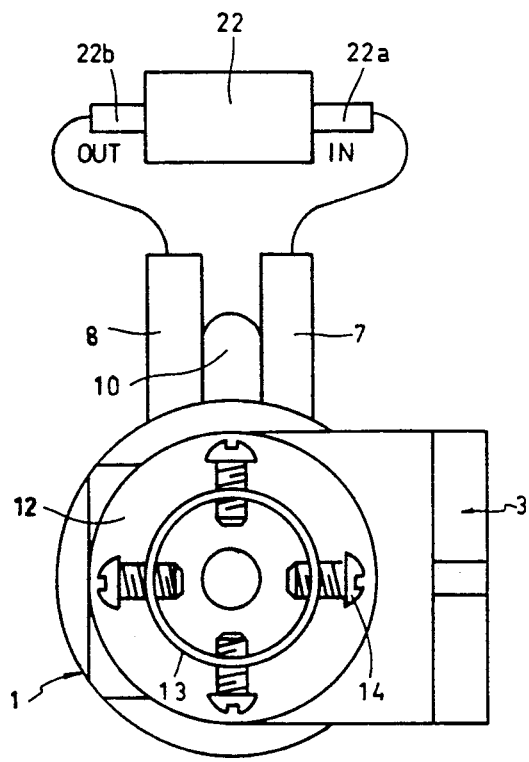
Figure 25:
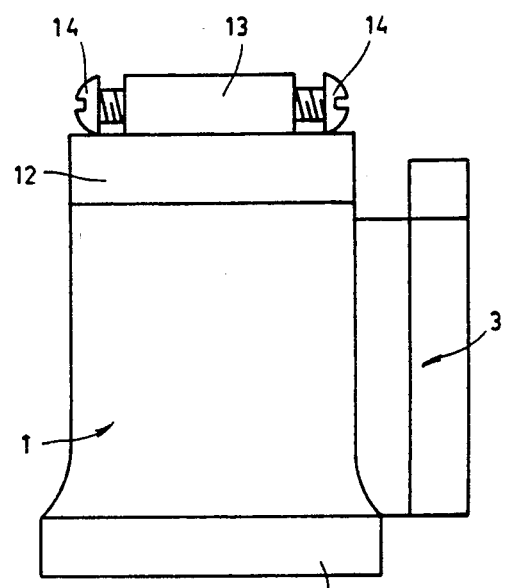
Figure 26:
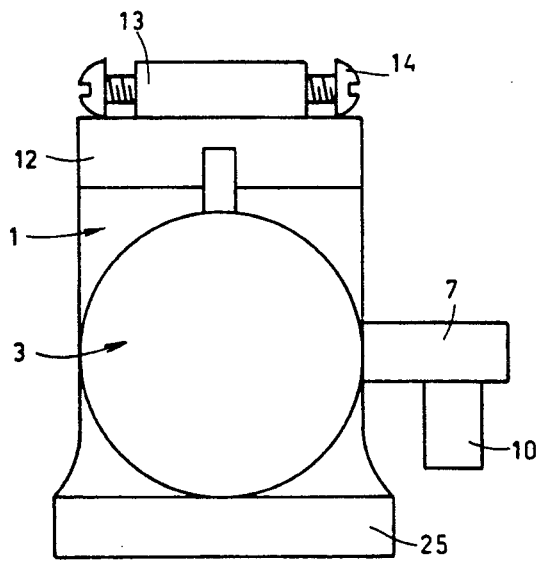
Figure 28:
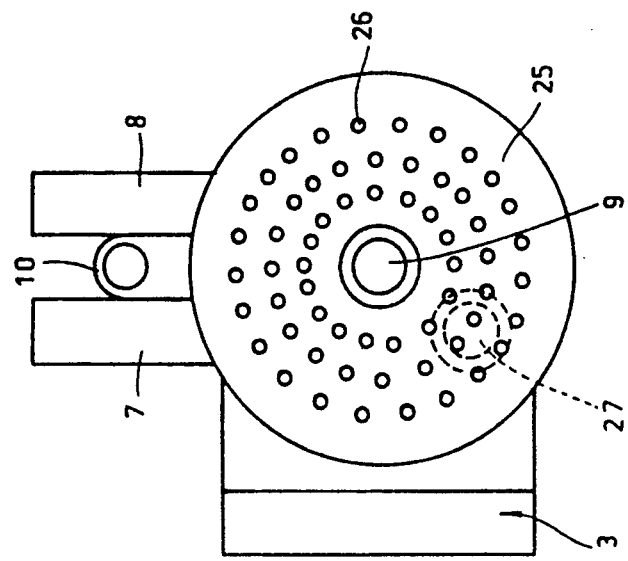
Figure 27:
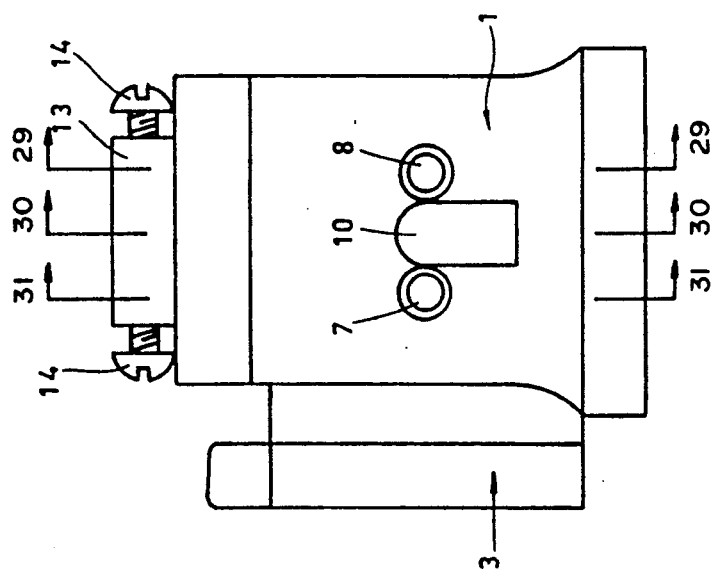

FIGS. 21 and 22 illustrate that the valve body 2 is rotated to a "stop" position to stop the flow of water from passing through the valve body. When the valve body 2 is maintained at the "stop" position, all the passage ways in the valve body 2 is blocked up by the blocking member 28, and therefore, no water is allowed to pass through the valve body 2.

Referring to FIGS. 23 through 46, therein illustrated is a third embodiment of the present invention in which the changeover valve is divided into three valve zones along its horizontal axis. FIGS. 23 through 28 show the structure of the changeover valve of the third embodiment. In this embodiment, the changeover valve also has a shower function. The numerals corresponding to that in FIGS. 1 through 22 indicate the same parts. In the valve case 1, drain port 10 is disposed between the first connecting port 7 and the second connecting port 8 and aligned therewith into one row. The water outlet 27 for shower is made on the circle where the first connecting port 7 is allocated. The valve body 2 is divided into three valve zones along its horizontal axis, or in axial direction, namely, a first valve zone, a second valve zone and a third valve zone. In the first valve zone corresponding to the first connecting port 7 of the valve case 1 and the water outlet 27 for shower as shown in FIG. 31 (a cross section taken on line C—C of FIG. 27), there are provided passage ways 29A, 29B, 29C, and a passage way 30A distributed through the circumference of the valve body 2. In the second valve zone corresponding to the water outlet 9 and the drain port 10 as shown in FIG. 30 (a cross section taken on line D—D of FIG. 27), there are provided a passage way 29D and passage ways 30B, 30C, 30D. In the third valve zone corresponding to the second connecting port 8 as shown in FIG. 29 (a cross section taken on line E—E of FIG. 27), there are provided a passage way 29E and passage ways 30E, 30F.

FIGS. 29 through 46 illustrate the operation of the third embodiment of changeover valve in various operating positions. FIGS. 29 through 31 show the operation of the changeover valve in the "primeval water" position, wherein FIG. 29 shows the cross sectional view of the third valve zone of the valve body 2; FIG. 30 shows the cross sectional view of the second valve zone of the valve body 2; FIG. 31 shows the cross sectional view of the first valve zone.

Figure 34:
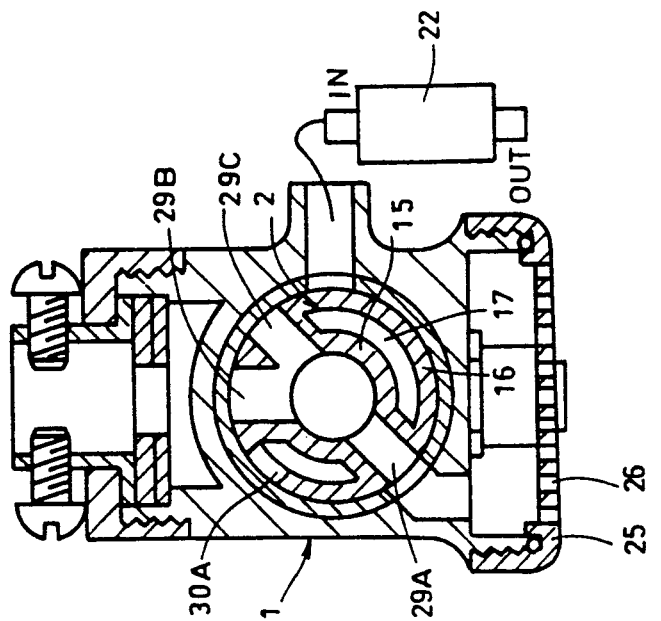
Figure 33:
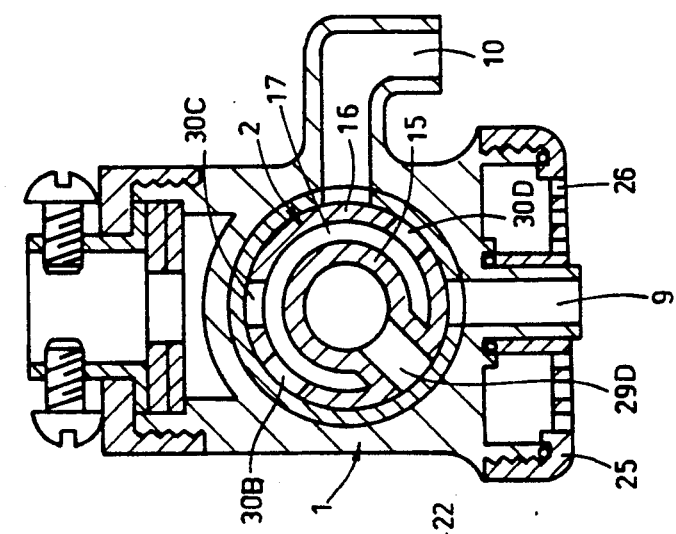
Figure 32:
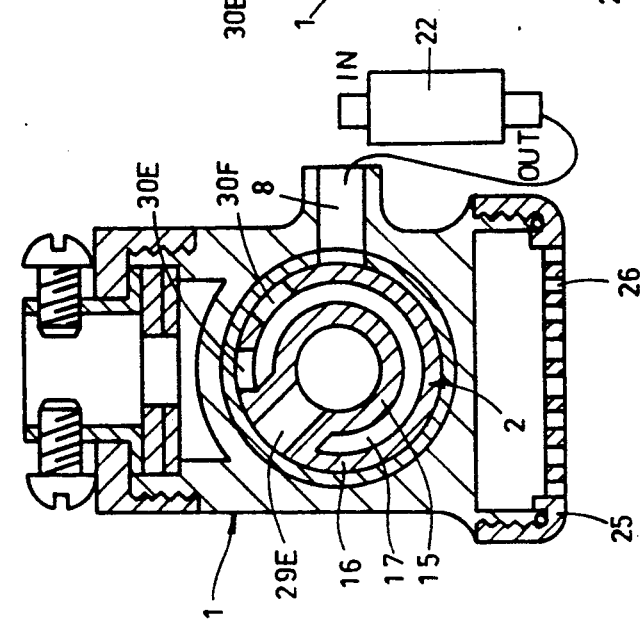

FIGS. 32 through 34 show the cross sectional views of the changeover valve of the third embodiment in operation at the "shower" position, wherein FIG. 34 is a cross sectional view of the third valve zone of the valve body 2; FIG. 33 is a cross sectional view of the second valve zone of the valve body 2; FIG. 34 is a cross sectional view of the first valve zone of the valve body 2.

FIGS. 35 through 37 show the cross sectional views of the changeover valve of the third embodiment in operation at the "filtration" position, wherein FIG. 35 is a cross sectional view of the third valve zone of the valve body 2; FIG. 36 is a cross sectional view of the second valve zone of the valve body 2; FIG. 37 is a cross sectional view of the first valve zone of the valve body 2.

Figure 40:
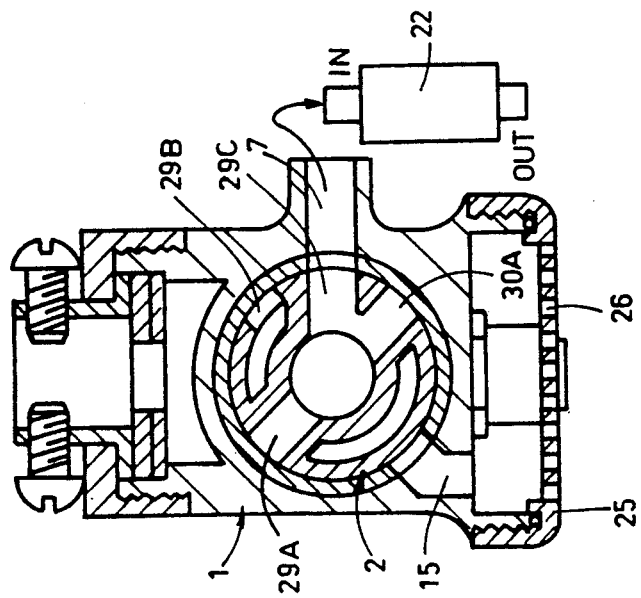
Figure 39:
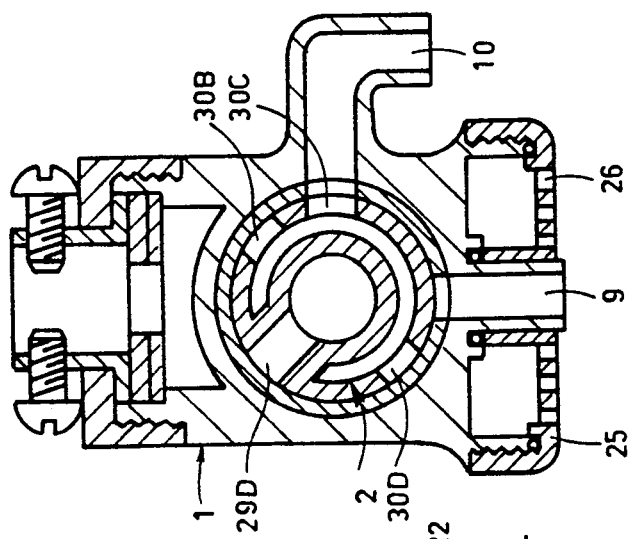
Figure 38:
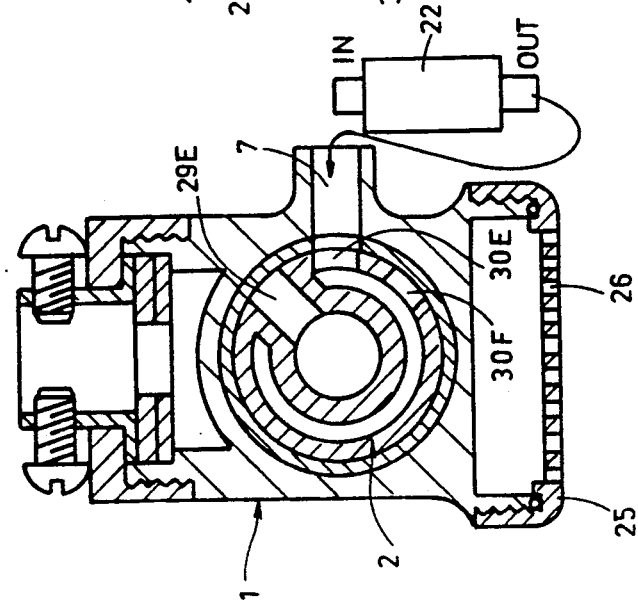

FIGS. 38 through 40 show the cross sectional views of the changeover valve of the third embodiment in operation at the "rinsing" position, wherein FIG. 38 is a cross sectional view of the third valve zone of the valve body 2; FIG. 39 is a cross sectional view of the second valve zone of the valve body 2; FIG. 40 is a cross sectional view of the first valve zone of the valve body 2.

Figure 43:
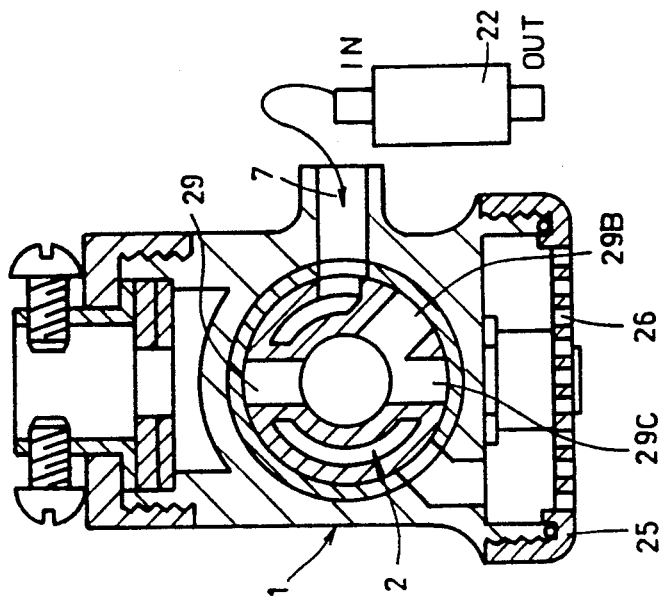
Figure 42:
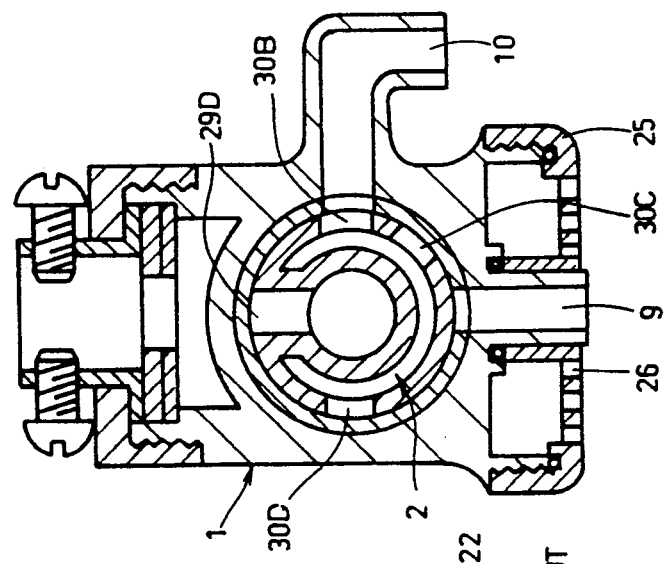
Figure 41:
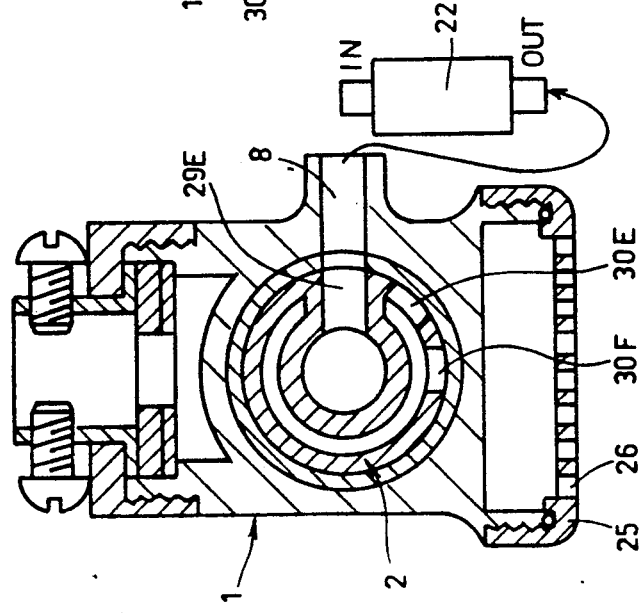

FIGS. 41 through 43 show cross sectional views of the changeover valve of the third embodiment in operation at the "backwashing" position, wherein FIG. 41 is a cross sectional view of the third valve zone of the valve body 2; FIG. 42 is a cross sectional view of the second valve zone of the valve body 2; FIG. 43 is a cross sectional view of the first valve zone of the valve body 2.

FIGS. 44 through 46 show cross sectional views of the changeover valve of the third embodiment in operation at the "stop" position wherein FIG. 44 is a cross sectional view of the third valve zone of the valve body 2; FIG. 45 is a cross sectional view of the second valve zone of the valve body 2; FIG. 46 is a cross sectional view of the first valve zone of the valve body 2.

The operational procedure of the third embodiment of changeover valve under each operational position is similar to the first and second embodiments of the present invention, and therefore, no detailed description in operational procedure for the third embodiment is required.

Referring to FIGS. 47 through 53, therein illustrated is a fourth embodiment of changeover valve as constructed according to the present invention. In this embodiment, "rinsing" operation is performed before the "filtration" operation when the valve body 2 is rotated in one direction. As illustrated in the drawings, the valve case 1 has a first connecting port 7 and a second connecting port 8 at one side of valve case 1 in axial direction, a drain port 10 and a water outlet 9 disposed below the first connecting port 7; the valve body 2 is divided into two valve zones, namely a first valve zone corresponding to the first connecting port 7, the drain port 10 and the water outlet 9 on the valve case 1, and a second valve zone corresponding to the second connecting port 8 and the water outlet 27 for shower. In the first valve zone, there are provided passage ways 31A, 31B and passage ways 32A, 32B respectively distributed through the circumference of the valve body 2. In the second valve zone, there are provided passage ways 31C, 31D and passage ways 32C, 32D respectively distributed through circumference of the valve body 2.

Figures 47, 48:
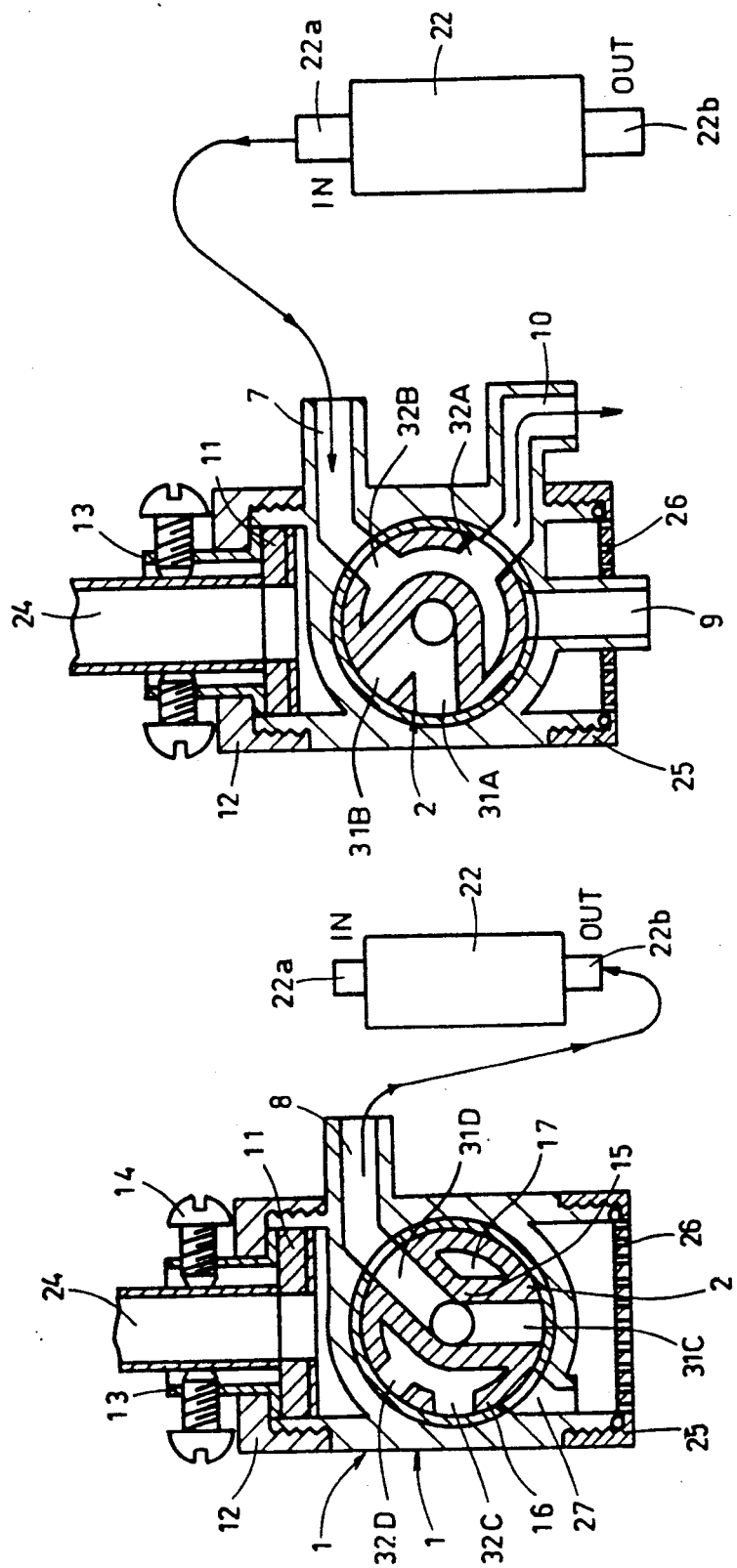
Figure 52:
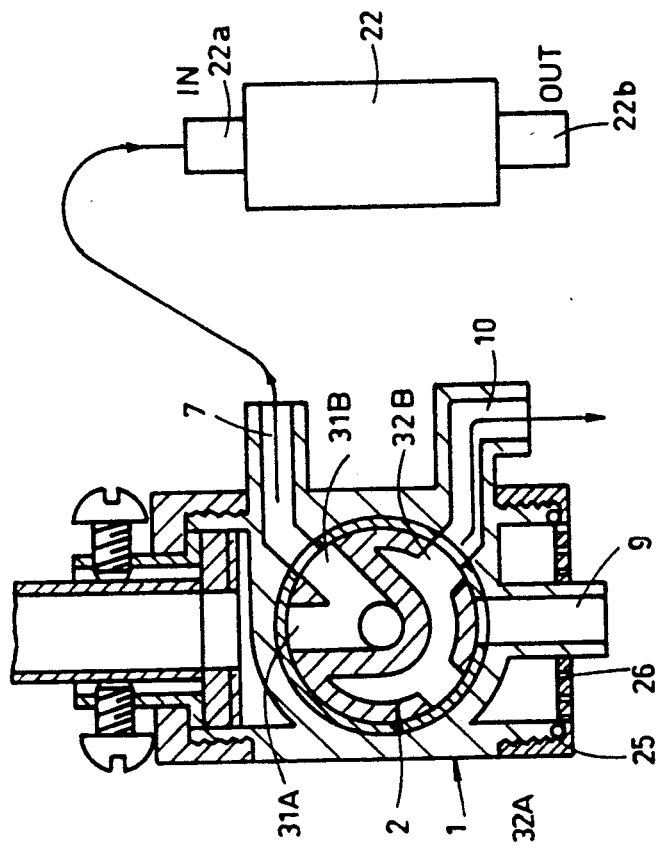
Figure 51:
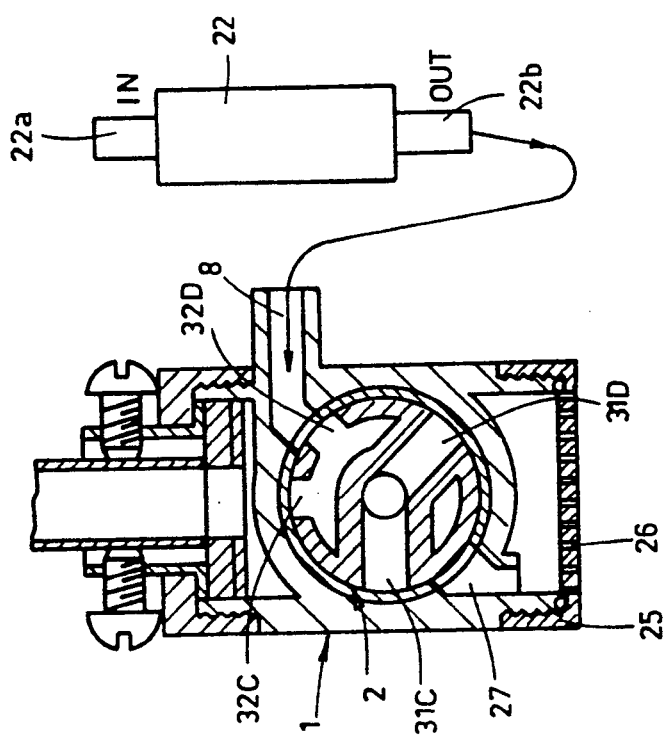
Figures 53, 54:
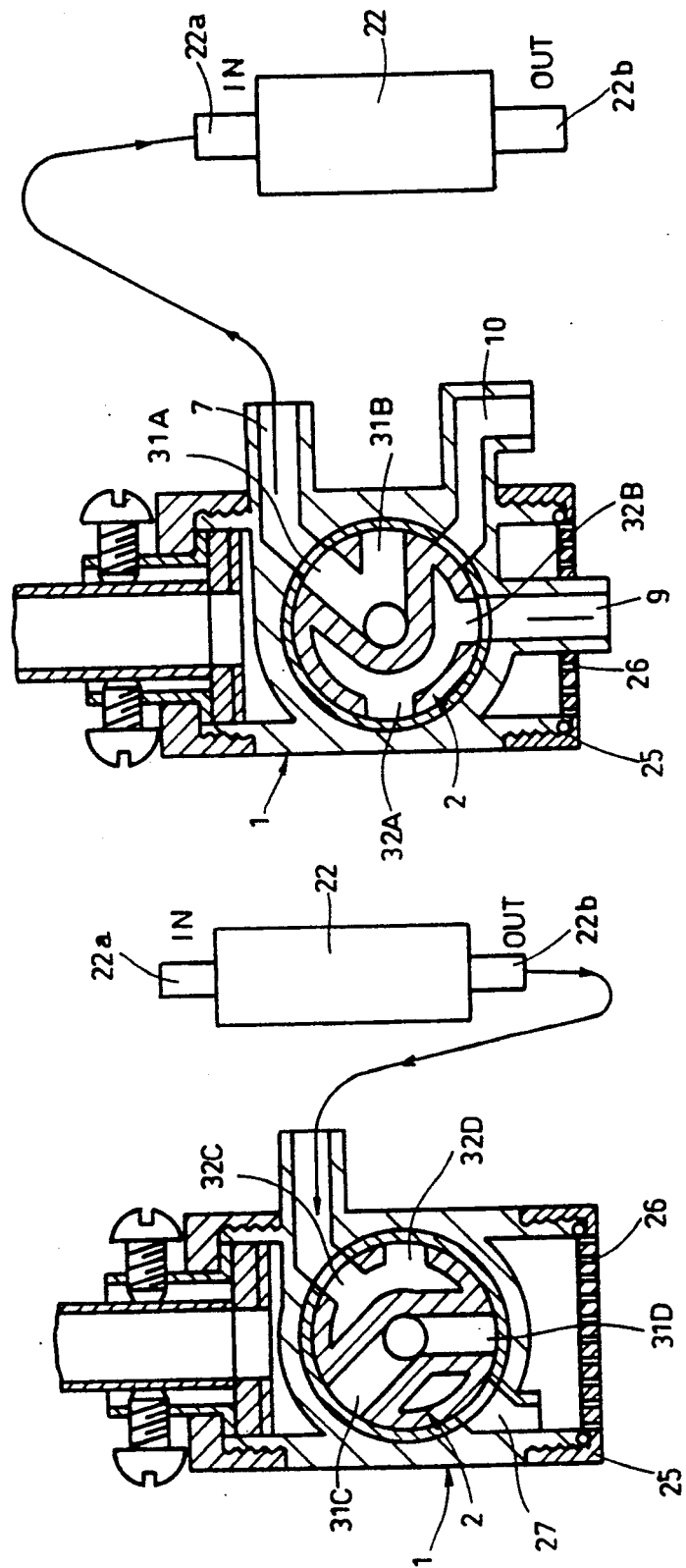

FIGS. 47 through 54 illustrate the cross sectional views of the changeover valve of the fourth embodiment in operation at various operational position. FIGS. 47 and 48 are cross sectional views of the valve in operation at the "backwashing" position, wherein FIG. 47 is a cross sectional view of the second valve zone of the valve body 2; FIG. 48 is a cross sectional view of the first valve zone of the valve body 2. FIGS. 49 and 50 are cross sectional views of the valve in operation under the "primeval water" position, wherein FIG. 49 is a cross sectional view of the second valve zone of the valve body 2; FIG. 50 is a cross sectional view of the first valve zone of valve body 2. FIGS. 51 and 52 are cross sectional views of the valve in operation under "rinsing" position, wherein FIG. 51 is a cross sectional view of the valve body 2; FIG. 52 is a cross sectional view of the first valve zone of the valve body 2. FIGS. 53 and 54 are cross sectional views of the valve in operation at the "filtration" position, wherein FIG. 53 is a cross sectional view of the second valve zone of the valve body 2; FIG. 54 is a cross sectional view of the first valve zone of the valve body 2.

Referring to FIGS. 55 through 58 therein illustrated is a fifth embodiment of changeover valve as constructed according to the present invention. In this embodiment, water from a water supply device is guided into the valve from the top above the valve chamber, and the valve case 1 does not have the passage way 5. There is a passage way 33 made on the wall of the valve chamber 4 at the top connecting with the water intake 6 on the valve case 1 for guiding water into the inner cylinder portion 15 of the valve body 2. The valve body 2 does not provide any shower function. The numerals for the parts similar to that in FIGS. 1 and 22 remain unchanged.

Figure 55:
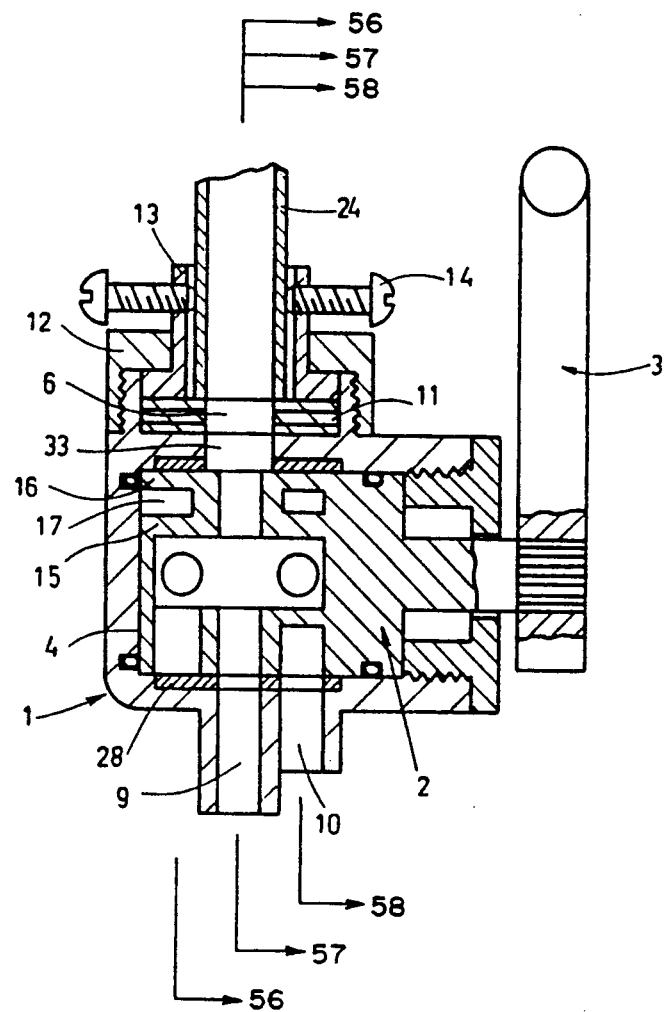

As indicated in FIG. 55, the first and second connecting ports 7, 8 are arranged on the valve case 1 in a row; the drain port 10 is made on the circle where the first connecting port 7 is allocated; the water outlet 9 is made on the valve case 1 at the bottom between the first and second connecting ports 7, 8. The valve body 2 is divided into three valve zones, namely, a first valve zone having passage ways 34A, 34B and passage ways 35A, 35B, 35C distributed through the circumference thereof corresponding to the first connecting port 7 and the drain port 10 on the valve case 1, a second valve zone having passage ways 34C through 34G and passage way 35D distributed through the circumference thereof corresponding to the water outlet 9 on the valve case 1, and a third valve zone having passage way 34H and passage ways 35E, 35F distributed through the circumference thereof corresponding to the second connecting port 8 on the valve case 1.

FIGS. 56 through 58 show cross sectional views of the changeover valve of the fifth embodiment in operation at the "rinsing" position. FIG. 56 is a cross section taken on the third valve zone (along line F—F of FIG. 55) of the valve body 2. FIG. 57 is a cross section taken on the second valve zone (along line G—G of FIG. 55) of the valve body 2. FIG. 58 is a cross section taken on the first valve zone (along line H—H of FIG. 55) of the valve body 2.

Figure 59:
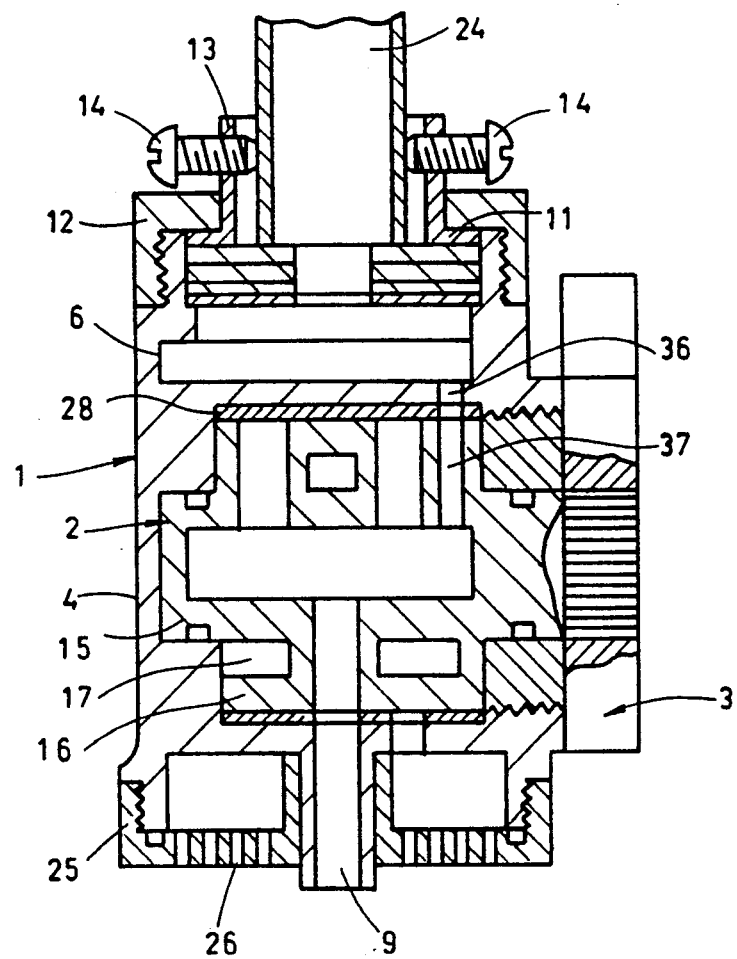
FIG. 59 is a longitudinal cross sectional view of a sixth embodiment of the changeover valve of the present invention.
Figure 60:
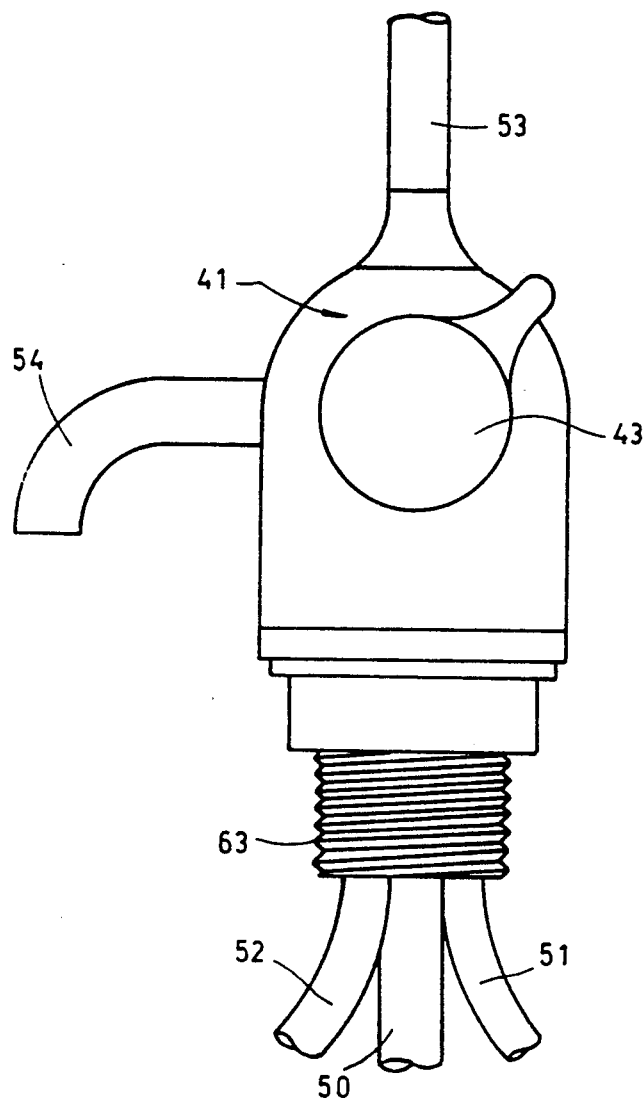
Figure 61:
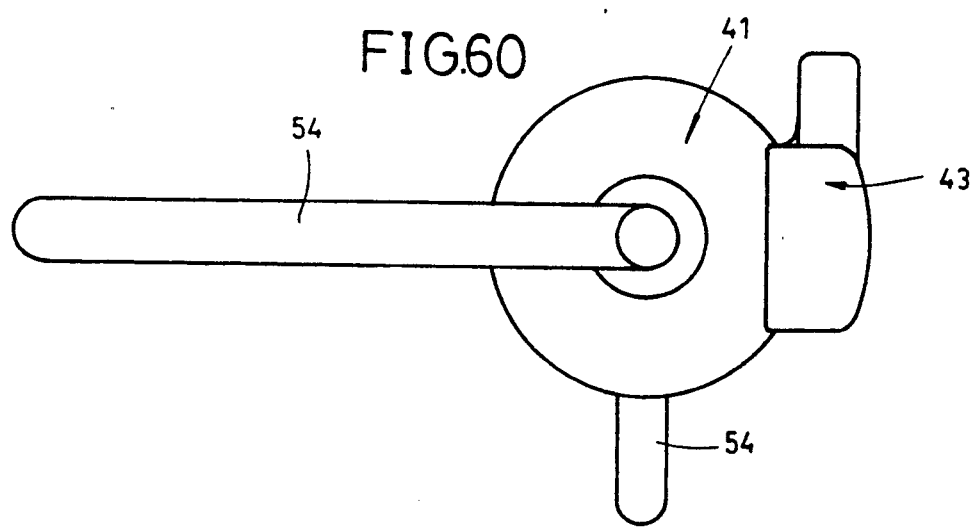
Figure 62:
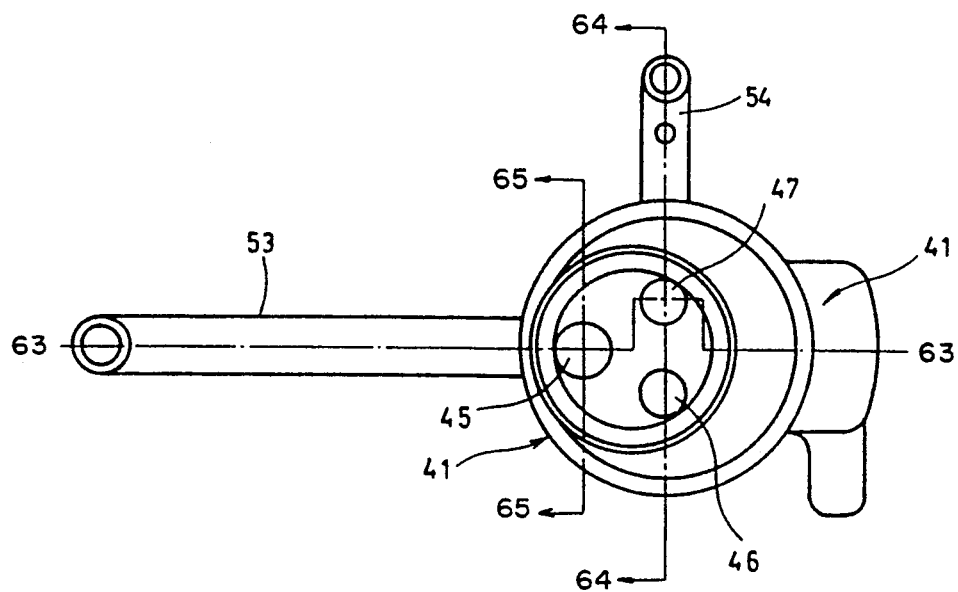
Figure 63:
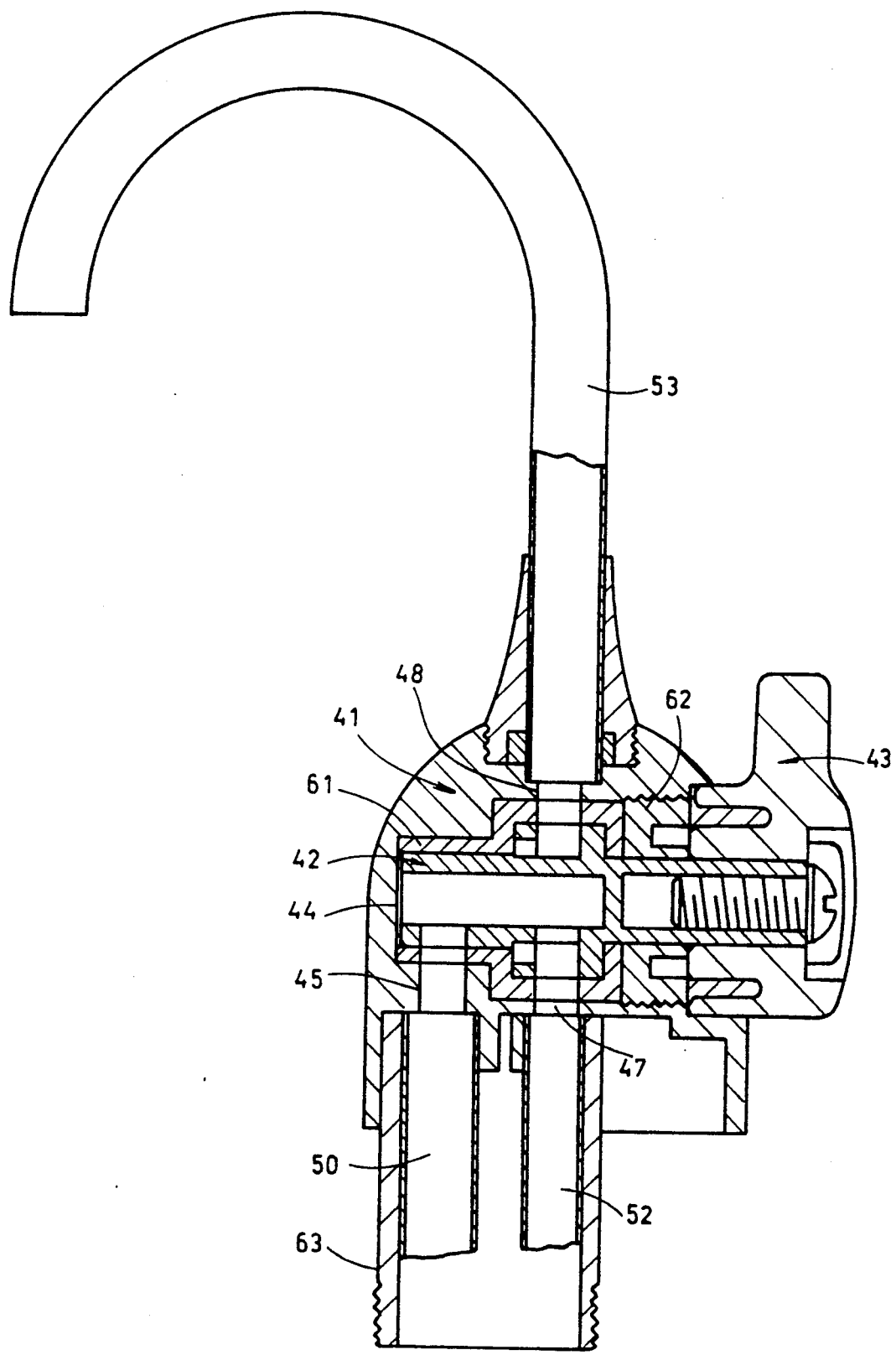

FIG. 59 shows a sixth embodiment of the changeover valve of this invention. Similar to the fourth embodiment of the present invention, water is taken in through a water intake above the valve chamber 4. In this embodiment, the valve chamber 4 comprises a hole 3b connecting with the passage way 5 on the valve case 1, and the valve body 2 has a passage way 37 connecting with the passage way 36.

Referring to FIGS. 60 through 71, therein illustrated is a seventh embodiment of changeover valve as constructed according to the present invention. This embodiment is most suitable for use in a sink in the kitchen. In this embodiment, the valve body is divided into two valve zones, namely, a first valve zone (the cross section taken on line J—J of FIG. 62) and a second valve zone (the cross section taken on line K—K of FIG. 62). The structure of the seventh embodiment of changeover valve is outlined hereinafter with reference to FIGS. 60 through 65. In the drawings, numerals 41, 42 and 43 designate the valve case, the valve body and the control knob respectively. The valve case 41 defines therein a cylindrical valve chamber 44 having a horizontal, central axis. A water intake 45 for the second valve zone is made on the lower side of the wall surrounding the valve chamber 44. A first connecting port 46 and a second connecting port 47 are formed spatially in the valve chamber 44 in peripheral direction. A water outlet 48 is made on the wall of the valve case 1 at the top, and a drain port 49 is made on the wall of the valve case 1 at one side. The water intake 45, the first and second connecting ports 46, 47, the water outlet 48 and the drain port 49 are respectively connected to the internal space of the valve chamber 44. The water intake 45 is connected to a water supply pipe 50 of a water supply device. Connecting pipes 51, 52 are respectively connected to the first and second connecting ports 46, 47. A water outlet pipe 53 and a drain pipe 54 are respectively attached to the water outlet 48 and the drain port 49. Further, there is provided a seal member 61 along the inner peripheral wall of the valve chamber 44 to seal the valve body 42 from the valve chamber 44. The valve body 42 comprises an inner cylinder portion 55 surrounded with an outer cylinder portion 56, a passage way 57 defined within said inner and outer cylinder portion 55, 56, a water intake 58 for guiding water from the water intake 45 of the valve case 41 into the inner cylinder portion 55, passage way 59 for connecting the inner cylinder portion 55 with the outside, and passage ways 60A, 60B, 60C, 60D for connecting the outer cylinder portion 56 with the outside. The valve body 42 is rotatably supported by a supporting ring 62 to which a control knob 43 is securely attached. Therefore, by rotating the control knob 43, the valve 42 is caused to rotate inside the valve chamber 44. By means of rotating the control knob 43, the valve 42 can be selectively rotated to "filtration", "rinsing" or "backwashing" position. In the drawings, the numeral 63 designates a mounting member such as a fastening nut.

Figures 64, 65:
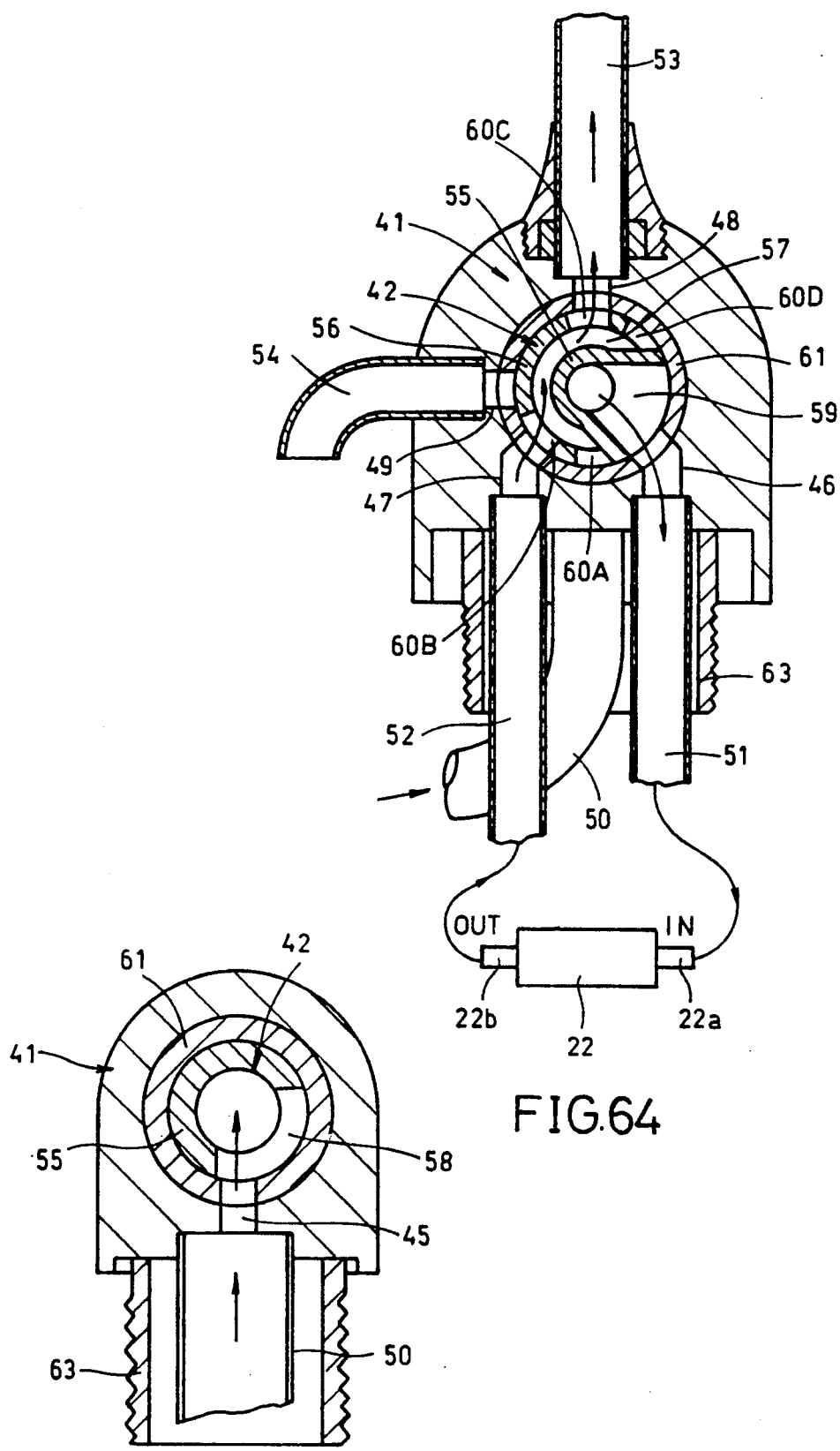
Figures 66, 67:
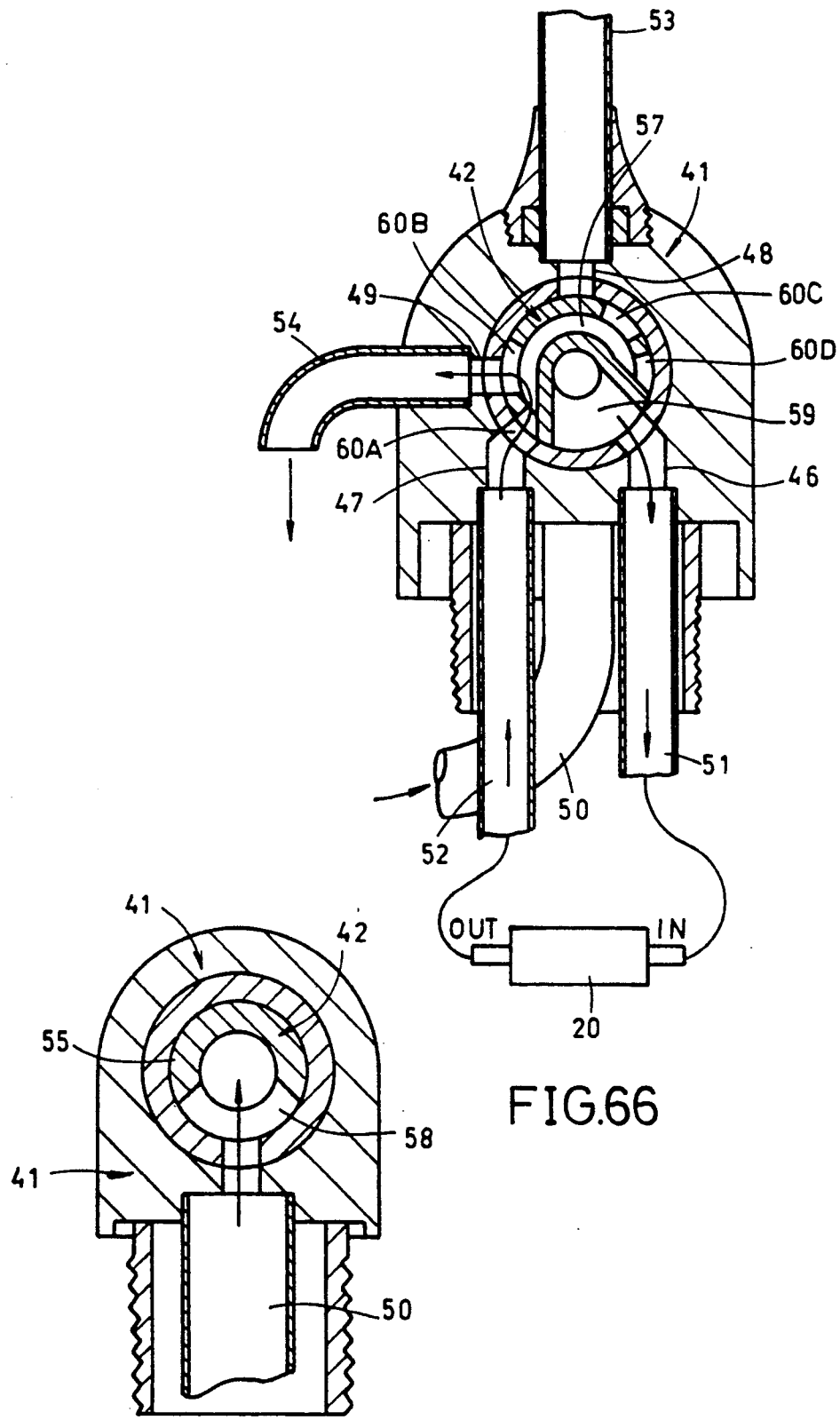

When the control knob 43 is rotated, the valve body will be rotated to pass through the positions of "filtration", "rinsing", "backwashing" and "stop". FIGS. 64 and 65 show the water flowing route at "filtration" position, wherein FIG. 64 is a cross sectional view of the valve case 41 and the valve body 42 taken through the first valve zone; FIG. 65 is a cross sectional view of the valve case 41 and the valve body 42 taken through the second valve zone. At the "filtration" position, water from the water supply pipe 50 passes through the water intake 45 of the valve case 41, the water intake 58 of the valve body 42, the inner cylinder portion 55, the first connecting port 46 of the valve case 41, the connecting pipe 51, the water inlet port 22a of the water filter 22, the water filter 22, the water outlet port 22b of the water filter 22, the water filter 22, the water outlet port 22b of the water filter 22, the connecting pipe 52, the second connecting port 47 of the valve case 41, the passage way 60B on the valve 42, the passage way 57 and the passage way 60C, and then through the water outlet pipe 53 via the water outlet 48. FIGS. 66 and 67 show the water flowing route with the valve body at the "rinsing" position, wherein FIG. 66 is a cross sectional view of the valve case 41 and the valve body 42 taken through the first valve zone; FIG. 67 is a cross sectional view of the valve case 41 and the valve body 42 taken through the second valve zone. At the "rinsing" position, water from the water supply pipe 50 passes through the water intake 45 of the valve case 41, the water intake 48 of the valve 42, the inner cylinder portion 55, the first connecting port 46 of the valve case 41, the connecting pipe 51, the water inlet port 22a of the water filter 22, the water filter 22, the water outlet port 22b of the water filter 22, the connecting pipe 52, the second connecting port 47 of the valve case 41, the passage way 60A of the valve body 42, the passage way 57 and the passage way 60B, and then through the drain pipe 54 via the drain port 49.

Figure 68:
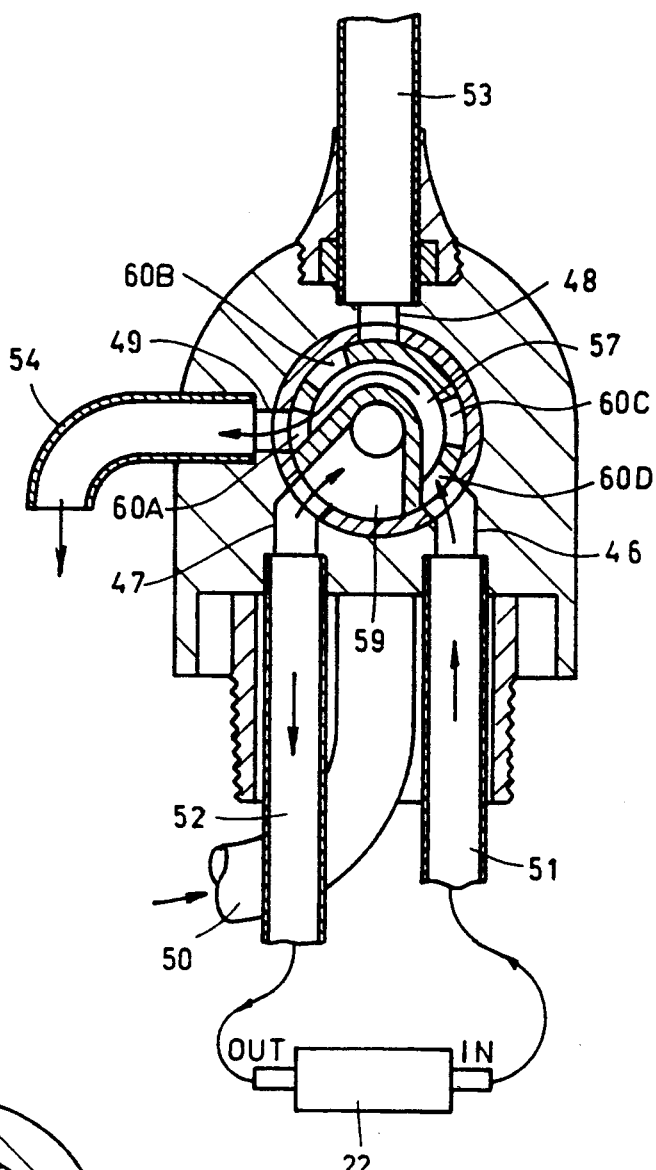
Figure 69:
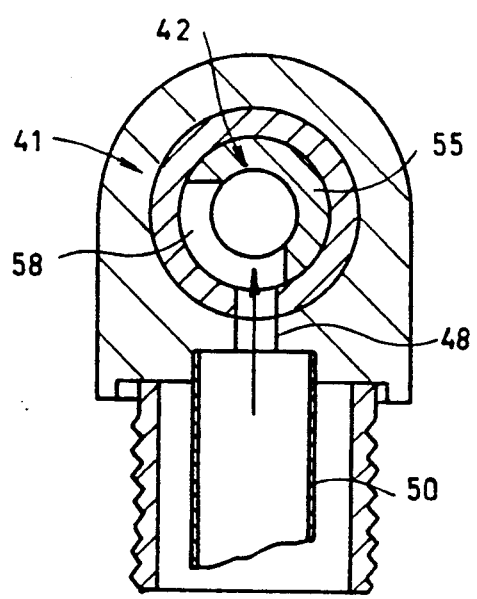

FIGS. 68 and 69 show the water flowing route with the valve body at the "backwashing" position, wherein FIG. 68 is a cross sectional view of the valve case 41 and the valve body 42 taken through first valve zone; FIG. 69 is a cross sectional view of the valve case 41 and the valve body 42 taken through the second valve zone. At the "backwashing" position, water from the water supply pipe 50 passes through the water intake 45 of the valve case 41, the water intake 48 of the valve 42, the inner cylinder portion 55, the second connecting port 47 on the valve case 41, the connecting pipe 52, the water outlet port 22b of the water filter 22, the water filter 22, the water inlet port 22a of the water filter 22, the connecting pipe 51, the first connecting port 46 on the valve case 41, the passage way 60D on the valve body 42, the passage way 57, and the passage way 60A, and then the drain pipe 54 via the drain port 49.

Figures 70, 71:
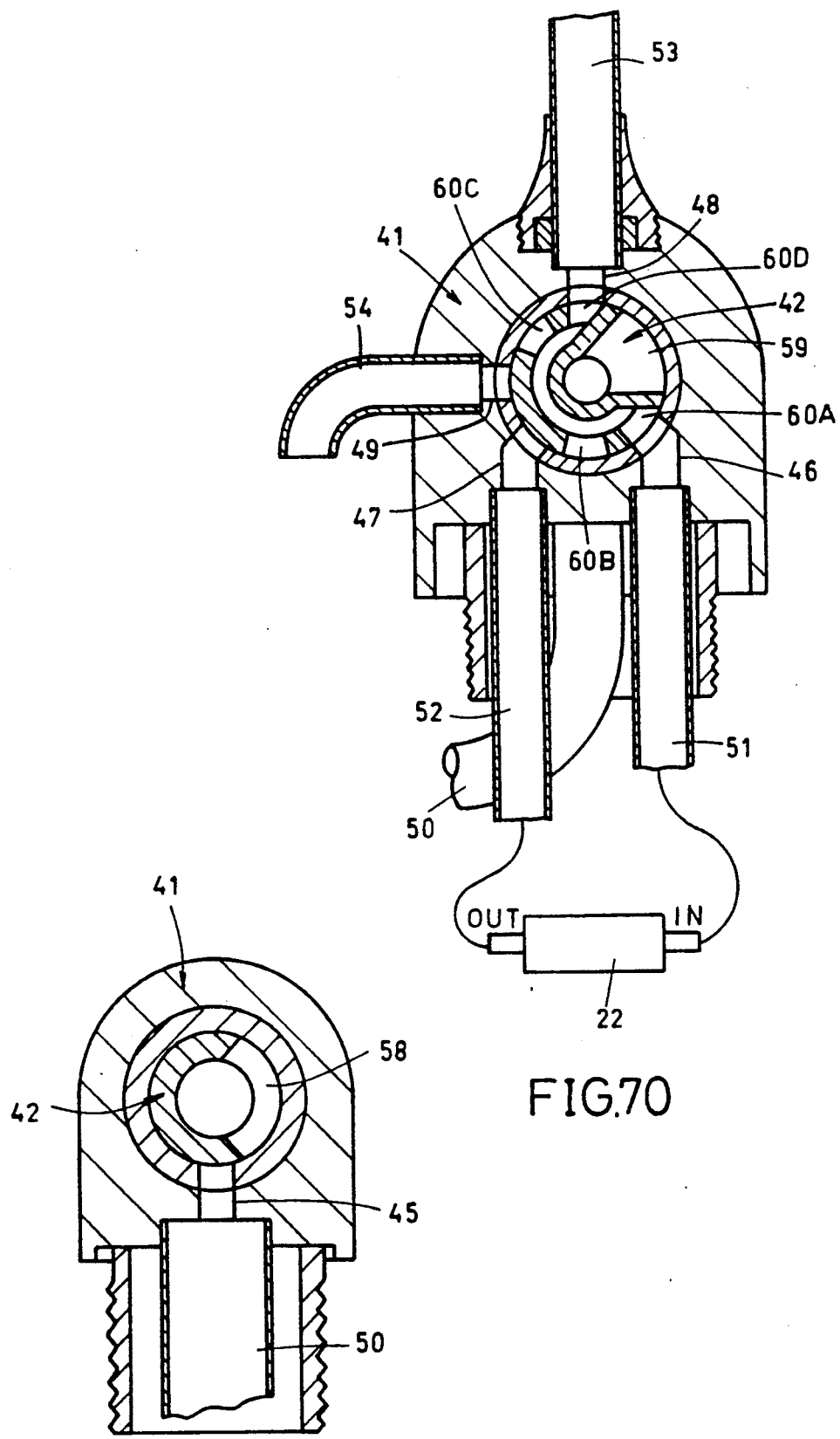

FIGS. 70 and 71 show that the valve body is at "stop" position, wherein FIG. 70 is a cross sectional view of the valve case 41 and the valve body 42 taken through the first valve zone; FIG. 71 is a cross sectional view of the valve case 41 and the valve body 42 taken through the second valve zone. When the valve body is rotated to the "stop" position, water is stopped from passing therethrough.

As indicated, the present invention is to provide a changeover valve which is compact and simple in structure and which can be selectively rotated to various positions including "primeval water", "rinsing" and "backwashing", to perform the desired operation.

What is claimed is:

1. A changeover valve comprising:
   a valve case, said valve case having a water intake adapted to be connected to a water supply device, a water outlet, a drain port, a first connecting port adapted to be connected to a water inlet port of a water filter, and a second connecting port adapted to be connected to the water outlet port of said water filter;
   a valve body rotatably disposed inside said valve case, said valve body comprising an inner cylinder portion, an outer cylinder portion surrounding around said inner cylinder portion, and internal passage way defined between said inner cylinder portion and said outer cylinder portion, an intake hole communicating said inner cylinder portion and said water intake of said valve case, a first passage way formed on said outer cylinder portion for connecting said inner cylinder portion to the space outside said outer cylinder portion, a second passage way formed on said outer cylinder portion for connecting said internal passage way to the space outside said outer cylinder portion;

a control knob securely attached to said valve body for driving said valve body to rotate, permitting said valve body to be alternatively disposed at a "filtration" position where water from said water supply device flows from said water inlet port of said water filter into said water filter and then flows out of said water filter through said water outlet port for further discharge through said water outlet of said valve case, at a "backwashing" position where water from said water supply flows from the water outlet port of said water filter into said water filter and then flows out of said water filter through said water inlet port for further discharge through said drain port of said valve case, or at a "rinsing" position where water from said water supply flows from said water inlet port of said water filter into said water filter and then flows out of said water filter through said water outlet port for further discharge through said drain port of said valve case;

wherein said first passage way on said valve body is connected to said first connecting port of said valve case when said valve is rotated to said "filtration" or "rinsing" position, or connected to said second connecting port on said valve case when said valve body is rotated to said "backwashing" position; said second passage way on said valve is connected to said first connecting port and the water outlet port of said valve case when said valve body is rotated to said "filtration" position, or connected to said second connecting port and said drain port of said valve case when said valve body is rotated to said "backwashing" position, or connected to said first connecting port and said drain port of said valve case when said valve body is rotated to said "rinsing" position.

* * * * *